United States Patent
Koelzer

(10) Patent No.: US 8,973,922 B2
(45) Date of Patent: Mar. 10, 2015

(54) AIR SUSPENSION HEIGHT CONTROL VALVE WITH DUAL RIDE HEIGHT POSITIONS

(71) Applicant: Haldex Brake Products Corporation, Kansas City, MO (US)

(72) Inventor: Robert L. Koelzer, Olathe, KS (US)

(73) Assignee: Haldex Brake Products Corporation, Kansas City, MO (US)

( * ) Notice: Subject to any disclaimer, the term of this patent is extended or adjusted under 35 U.S.C. 154(b) by 0 days.

(21) Appl. No.: 13/833,194

(22) Filed: Mar. 15, 2013

(65) Prior Publication Data

US 2014/0265172 A1 Sep. 18, 2014

(51) Int. Cl.
*B60G 17/052* (2006.01)
*B60G 17/056* (2006.01)
*F15B 13/043* (2006.01)
(Continued)

(52) U.S. Cl.
CPC ........ *B60G 17/0565* (2013.01); *B60G 17/0155* (2013.01); *B60G 17/0525* (2013.01); *F16K 11/0525* (2013.01); *B60G 2200/31* (2013.01);
(Continued)

(58) Field of Classification Search
CPC ........... B60G 17/0155; B60G 17/0523; B60G 17/0525; B60G 17/0565; B60G 2202/152; B60G 2202/1522; B60G 2500/202; B60G 2500/2021; B60G 2500/2022; B60G 2500/30; B60G 2500/302; B60G 15/08; B60G 15/12; B62D 21/20; F15B 13/0401; F15B 13/0402; F15B 13/0406; F15B 13/0422

USPC ............... 280/5.514, 6.157, 124.153, 124.16, 280/789; 137/625.6; 267/64.16
See application file for complete search history.

(56) References Cited

U.S. PATENT DOCUMENTS

| 749,990 A | 1/1904 | Holinger |
| 2,919,931 A * | 1/1960 | Cislo ......................... 267/64.16 |

(Continued)

FOREIGN PATENT DOCUMENTS

| DE | 1144125 B | 2/1963 |
| EP | 0296526 A2 | 12/1988 |
| EP | 1533150 A2 | 5/2005 |

OTHER PUBLICATIONS

Haldex Brake Products; Air Suspension, EGP Height Control Valve With Dual Ride Height, 2 pages, Feb. 2009.
(Continued)

*Primary Examiner* — Paul N Dickson
*Assistant Examiner* — Laura Freedman
(74) *Attorney, Agent, or Firm* — Stinson Leonard Street LLP

(57) ABSTRACT

A height control valve assembly having a housing with an air supply port, first and second ports, and an exhaust port. A valve positioned in the housing has a first surface in fluid communication with the air supply port and a second surface. The valve moves between first and second positions, in which the second surface sealingly engages a portion of the housing surrounding the first and second ports, respectively, to prevent fluid from flowing between the air supply port and the first and second ports, respectively. The valve is moveable from either of the first and second positions to a fill position, in which the air supply port is in fluid communication with one of the first and second ports, and an exhaust position, in which one of the first and second ports is in fluid communication with the exhaust port.

26 Claims, 16 Drawing Sheets

(51) Int. Cl.
*B60G 17/015* (2006.01)
*F16K 11/052* (2006.01)

(52) U.S. Cl.
CPC ..... *B60G 2202/152* (2013.01); *B60G 2300/026* (2013.01); *B60G 2500/202* (2013.01)
USPC .................. 280/5.514; 137/625.6; 267/64.16; 280/6.157; 280/124.16

(56) References Cited

U.S. PATENT DOCUMENTS

| | | | | |
|---|---|---|---|---|
| 2,959,426 A | * | 11/1960 | Augustin | 267/64.19 |
| 2,967,547 A | * | 1/1961 | Pribonic | 137/627.5 |
| 2,974,675 A | * | 3/1961 | Cislo | 137/87.02 |
| 2,997,314 A | * | 8/1961 | Hill et al. | 267/64.19 |
| 3,000,400 A | * | 9/1961 | Cislo | 137/627.5 |
| 3,006,657 A | * | 10/1961 | Augustin | 280/6.159 |
| 3,048,193 A | * | 8/1962 | Cislo | 137/627.5 |
| 3,071,394 A | * | 1/1963 | Miller | 280/6.159 |
| 3,091,257 A | * | 5/1963 | Ellis et al. | 137/627.5 |
| 3,654,958 A | * | 4/1972 | Bitonti | 137/596.14 |
| 4,281,684 A | | 8/1981 | Broeg | |
| 4,697,822 A | * | 10/1987 | Blanz | 280/6.158 |
| 5,161,817 A | | 11/1992 | Daum et al. | |
| 5,207,246 A | * | 5/1993 | Meyer | 137/625.65 |
| 5,333,645 A | | 8/1994 | Galazin | |
| 5,335,695 A | | 8/1994 | Pierce | |
| 5,375,819 A | | 12/1994 | Galazin et al. | |
| 5,560,591 A | * | 10/1996 | Trudeau et al. | 267/64.16 |
| 5,651,555 A | | 7/1997 | O'Reilly et al. | |
| 5,934,320 A | * | 8/1999 | O'Reilly et al. | 137/625.21 |
| 6,412,790 B2 | | 7/2002 | McKenzie et al. | |
| 6,935,625 B2 | | 8/2005 | Bolt et al. | |
| 6,945,275 B2 | * | 9/2005 | Krechmery et al. | 137/625.21 |
| 6,991,239 B2 | | 1/2006 | Schutt et al. | |
| 7,028,996 B2 | | 4/2006 | Plath | |
| 7,117,890 B2 | | 10/2006 | Ching | |
| 7,192,012 B2 | | 3/2007 | Bolt et al. | |
| 7,192,033 B2 | | 3/2007 | Bolt et al. | |
| 7,204,478 B2 | | 4/2007 | Plath | |
| 7,306,239 B2 | | 12/2007 | Schutt et al. | |
| 7,887,065 B2 | * | 2/2011 | Trudeau et al. | 280/5.514 |
| 2003/0075883 A1 | | 4/2003 | Jin | |
| 2008/0252025 A1 | | 10/2008 | Plath | |
| 2013/0249175 A1 | * | 9/2013 | Ellifson | 280/6.157 |

OTHER PUBLICATIONS

Haldex Brake Products; Product Line Brochure, Air Suspension Systems, 6 pages, Jul. 2008.
Search Report and Written Opinion dated Jun. 5, 2014 for corresponding European Patent Application 14159323.6 (10 pgs.).

* cited by examiner

AIR SUSPENSION HEIGHT CONTROL VALVE WITH DUAL RIDE HEIGHT POSITIONS

CROSS-REFERENCE TO RELATED APPLICATIONS

Not applicable.

STATEMENT REGARDING FEDERALLY SPONSORED RESEARCH OR DEVELOPMENT

Not applicable.

BACKGROUND OF THE INVENTION

1. Field of the Invention

The invention relates to a height control valve for a vehicle air suspension, and, more particularly, to a height control valve with dual ride height positions.

2. Description of Related Art

Trailing arm suspensions are well known and are commonly used in heavy-duty vehicles, such as semi-tractors, trailers, buses, and recreational vehicles. A trailing arm suspension typically includes opposing trailing arm assemblies mounted to frame rails on opposite sides of the vehicle. Each of the trailing arm assemblies includes a trailing arm having one end pivotally connected to a hanger bracket suspended from the frame rail. The other end of the trailing arm mounts to an air spring, which is also mounted to the frame rail. The air spring dampens the pivotal rotation of the trailing arm about the hanger bracket relative to the frame rail.

An axle assembly typically spans and mounts to, or is carried by, the trailing arms. The axle assembly rotatably mounts ground-engaging wheels. Any movement of the wheels in response to their contact with the ground will result in a rotation of the trailing arms, which is dampened by the air springs.

The air springs typically include an air bag from which pressurized fluid can be introduced or exhausted to adjust the dampening performance of the air spring. Additionally, the volume of air in the air spring can be adjusted to alter the height of the frame rails relative to the trailing arms. Often, there is a preferred ride height for the vehicle and, depending on the load carried by the vehicle, the ride height can vary. Pressurized air is introduced to or exhausted from the air bags to adjust the relative height of the trailer frame rail with respect to the trailing arms for a particular load.

The adjustment of the ride height is traditionally accomplished by a height control valve having an inlet port, an air spring port, and an exhaust port. The inlet port is in fluid communication with the pressurized air system of the vehicle, the air spring port is in fluid communication with the air bags of the air springs, and the exhaust port is in fluid communication with the atmosphere. The height control valve is moveable between a neutral position, in which the air spring port is blocked, and fill and exhaust positions. In the fill position, the air spring port is placed in fluid communication with the inlet port to introduce pressurized air to the air springs, and in the exhaust position, the air spring port is placed in fluid communication with the exhaust port to exhaust air from the air springs. The valve typically has a housing that is mounted to the vehicle frame, and a lever arm mounted to the trailing arm or axle. Movement of the lever relative to the valve housing is indicative of the relative change in position between the trailing arm and the vehicle, and moves the valve between its neutral, fill, and exhaust positions.

One type of height control valve includes a disc that rotates with respect to a housing between the neutral, fill, and exhaust positions (see, e.g., U.S. Pat. No. 7,028,996). Air pressure within a chamber of the housing forces a portion of the disc into sealing engagement with the housing. The disc covers an air spring port in the housing when in the neutral position. As the disc rotates to the fill and exhaust positions, the air spring port is uncovered and placed into fluid communication with the inlet and exhaust ports, respectively. The disc seals against the housing without the use of rubberized seals. The valve is only operable to maintain a vehicle at a single ride height.

Another type of height control valve is operable to maintain a vehicle at one of two ride heights. This type of valve, however, includes rubberized seals that seal a moving piston with respect to a valve housing. The piston moves to selectively place various ports of the housing in fluid communication with each other. The rubberized seals of the valve are subject to wear as the piston reciprocates, leading to their eventual failure.

BRIEF SUMMARY OF THE INVENTION

The present invention is directed toward a height control valve assembly having a housing and a valve positioned within the housing. An air supply port, first and second ports, and an exhaust port extend through the housing. The valve has a first surface in fluid communication with the air supply port and a second surface. The valve moves between a first position, in which the second surface sealingly engages a portion of the housing surrounding the first port to prevent fluid from flowing between the air supply port and the first port, and a second position, in which the second surface sealingly engages a portion of the housing surrounding the second port to prevent fluid from flowing between the air supply port and the second port. The valve is moveable from either of the first and second positions to a fill position, in which the air supply port is in fluid communication with one of the first and second ports, and an exhaust position, in which one of the first and second ports is in fluid communication with the exhaust port.

Preferably, the height control valve assembly adjusts the ride height of a vehicle by controlling the flow of air entering and exiting an air spring. The housing preferably has a first wall coupled with a second wall. The first and second ports extend through the first wall and are operable to be selectively placed in fluid communication with the air spring. The exhaust port extends through the first wall, and the air supply port extends through the second wall and receives pressurized air. First and second ride height levels correspond to the first and second positions of the valve. When the valve is in the fill position, air fills the air spring for raising the ride height of the vehicle, and when the valve is in the exhaust position, air exhausts from the air spring for lowering the ride height of the vehicle.

A sequencing valve assembly is preferably coupled with the height control valve assembly. The sequencing valve assembly has a housing and a valve positioned within the housing. First and second ride height ports and an air spring port extend through the housing. The valve is moveable between a first ride height position, in which the first ride height port is in fluid communication with the air spring port, and a second ride height position, in which the second ride height port is in fluid communication with the air spring port. The valve of the height control valve assembly moves between its first and second positions in response to movement of the valve of the sequencing valve assembly between its first and second ride height positions.

The height control valve assembly allows a vehicle to easily switch between first and second ride heights, and maintain each of those ride heights as the vehicle travels over the road or is loaded and unloaded. If the height control valve assembly is used on a bus, the first ride height may be used for travel over the road, and the second ride height may be lower than the first ride height for boarding passengers. If the height control valve assembly is used with a semi-tractor, the first ride height may be used for travel over the road, and the second ride height may be lower than the first ride height for connecting the semi-tractor to a trailer. The height control valve assembly also preferably includes a valve which is not as susceptible to wear and degradation as conventional height control valves.

Additional aspects of the invention, together with the advantages and novel features appurtenant thereto, will be set forth in part in the description which follows, and in part will become apparent to those skilled in the art upon examination of the following, or may be learned from the practice of the invention. The objects and advantages of the invention may be realized and attained by means of the instrumentalities and combinations particularly pointed out in the appended claims.

DETAILED DESCRIPTION OF PREFERRED EMBODIMENT

Figure 1:
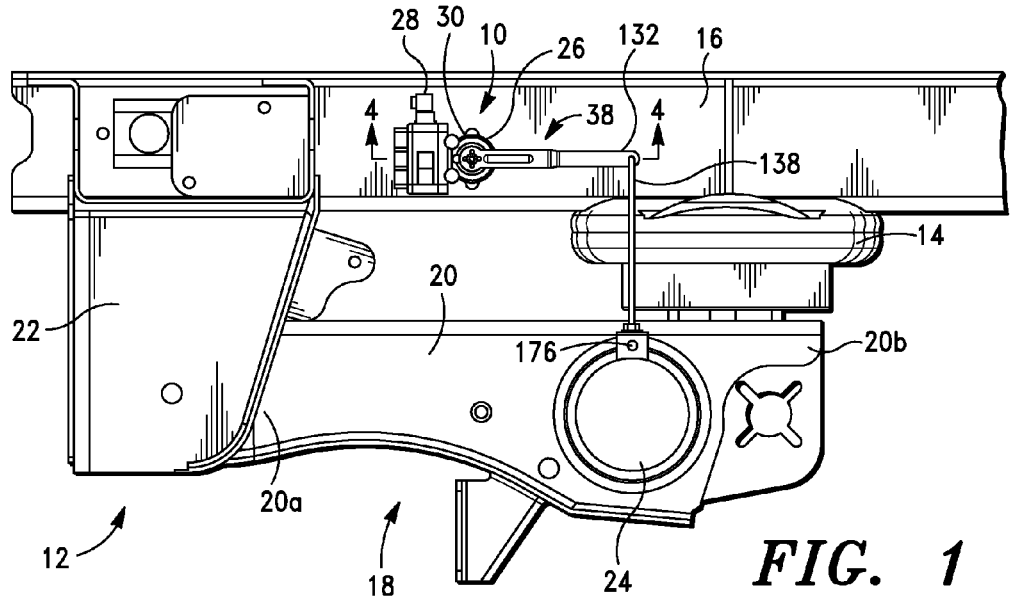
FIG. 1 is a side elevation view of a valve assembly in accordance with the present invention mounted to a vehicle having a trailing arm suspension and air spring.
Figure 2:
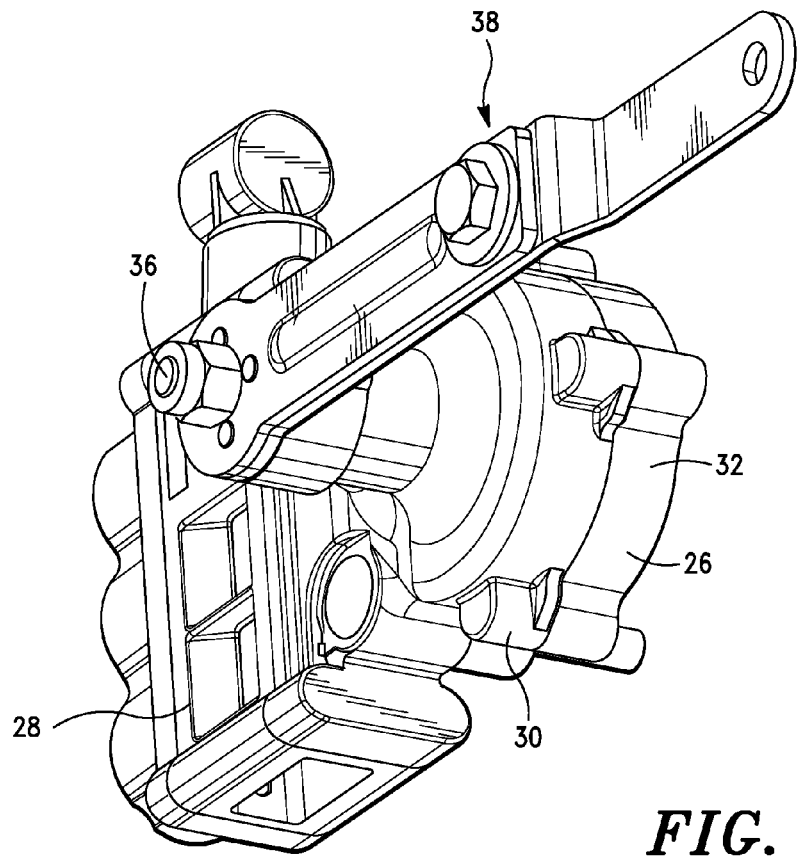
FIG. 2 is a perspective view of the valve assembly of FIG. 1.

Referring to FIG. 1, a valve assembly 10 is shown mounted to a vehicle 12. Valve assembly 10 is operable to adjust the ride height of the vehicle 12 by controlling the amount of air that enters and exits an air spring 14. Valve assembly 10 is mounted to a frame rail 16 of vehicle 12 above a trailing arm suspension 18 of the vehicle 12. Trailing arm suspension 18 includes a trailing arm 20 having a first end 20a that is pivotally connected to a hanger bracket 22 that extends downward from the frame rail 16. An axle 24 is received by an opening in trailing arm 20 and is fitted to the trailing arm 20 so that they move together. At least one ground engaging wheel (not shown) rotates with respect to the axle 24. Air spring 14 is mounted between a second end 20b of trailing arm 20 and frame rail 16.

Air spring 14 is in fluid communication with valve assembly 10 for regulating the introduction of air into air spring 14 and the exhaustion of air from air spring 14. As air enters air spring 14, the air spring 14 expands which moves the trailing arm 20 and axle 24 away from the vehicle frame 16 thereby raising the ride height of the vehicle 12. As air exhausts from air spring 14, the air spring 14 deflates which moves the trailing arm 20 and axle 24 toward the vehicle frame 16 thereby lowering the ride height of the vehicle 12. Valve assembly 10 includes a height control valve assembly 26 that is joined with a sequencing valve assembly 28. The height control valve assembly 26 is operable to maintain the ride height of vehicle 12 at a first or second ride height by automatically introducing air into air spring 14 when the ride height of the vehicle 12 lowers, and exhausting air from the air spring 14 when the ride height of the vehicle 12 raises. The sequencing valve assembly 28 is switchable between first and second ride height positions, which correspond with the first and second ride heights, respectively.

Figure 3:
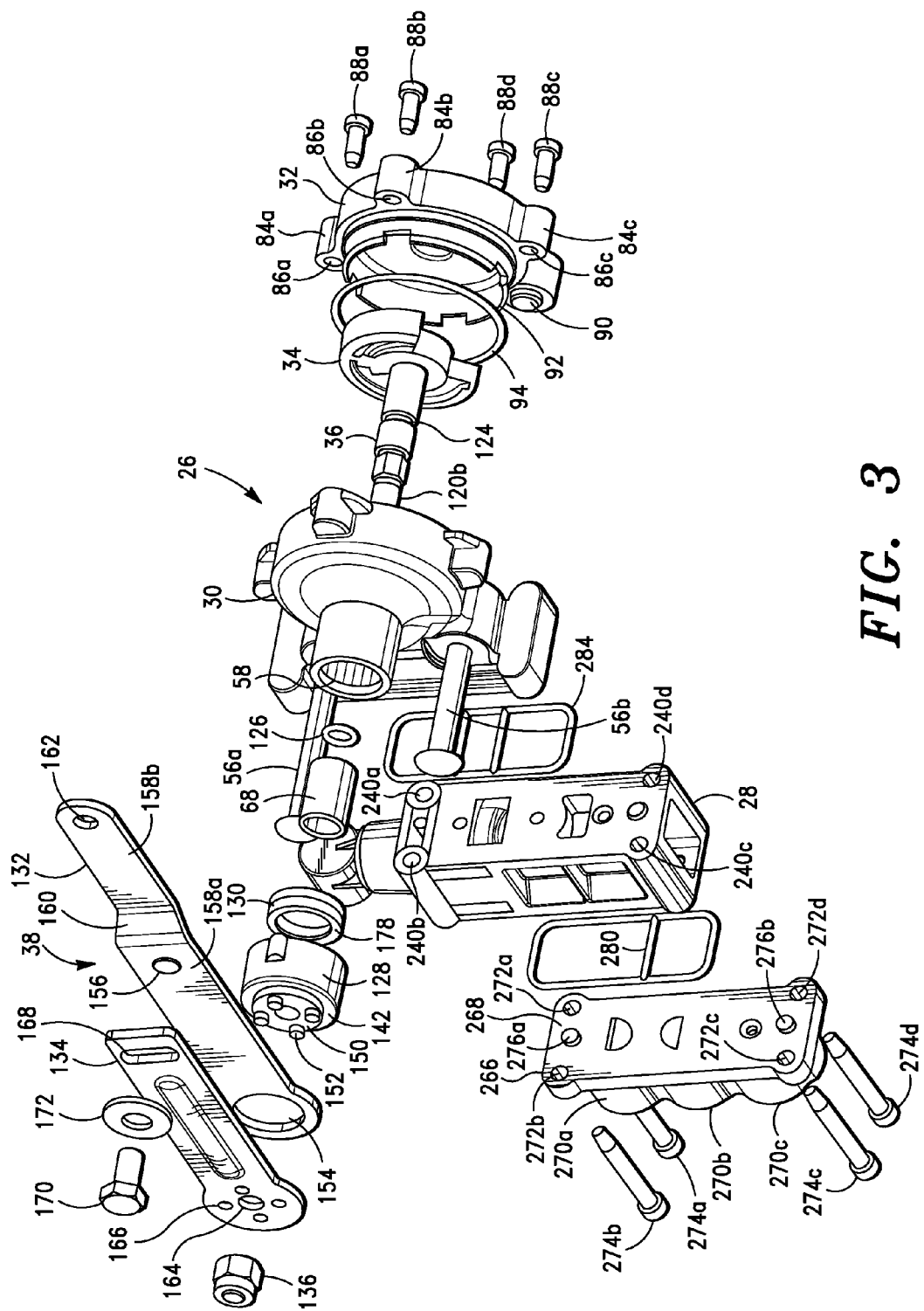
FIG. 3 is a partial exploded view of the valve assembly of FIG. 1.
Figure 4:
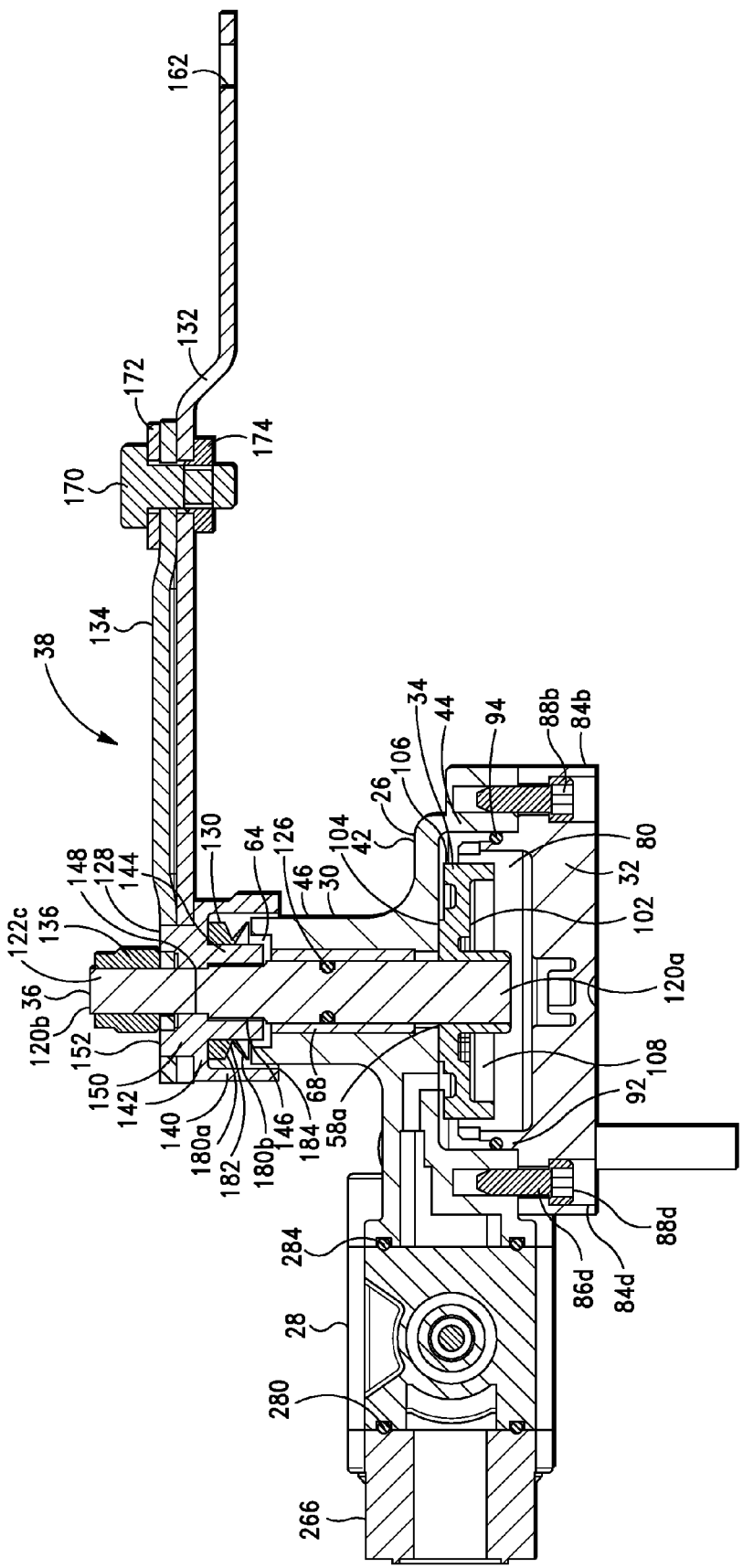
FIG. 4 is a cross-sectional view of the valve assembly taken through the line 4-4 in FIG. 1.

Referring to FIGS. 3-4, height control valve assembly 26 includes a housing 30, a cover 32 joined to one side of housing 30, a rotating disc 34 enclosed by housing 30 and cover 32, a shaft 36 having one end joined to disc 34, and a lever assembly 38 joined to the opposite end of shaft 36 as disc 34.

Figure 5:
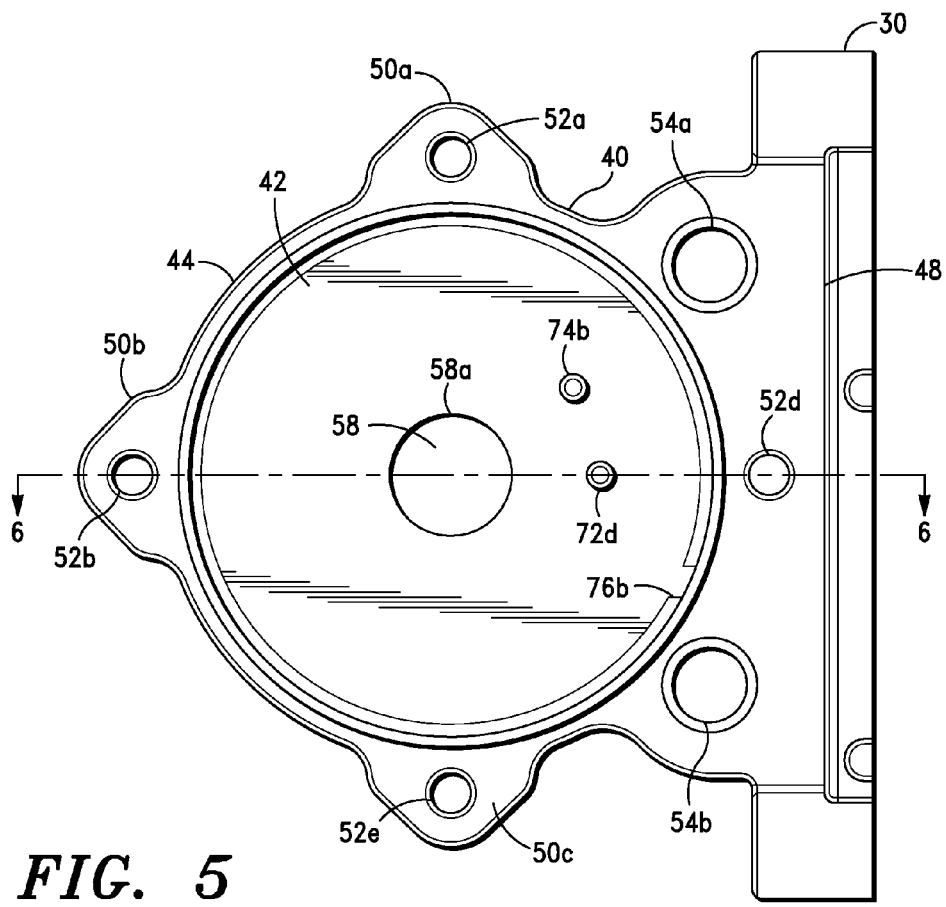
FIG. 5 is a side elevation view of a portion of a housing of a height control valve assembly of the valve assembly of FIG. 1.
Figure 6:
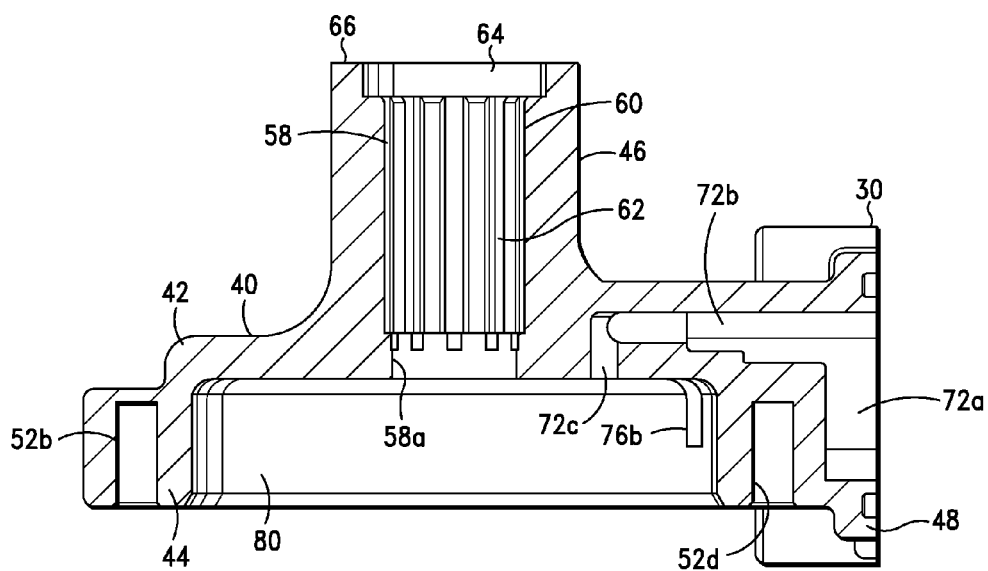
FIG. 6 is a cross-sectional view of the housing portion of FIG. 5 taken through the line 6-6 in FIG. 5.
Figure 7:
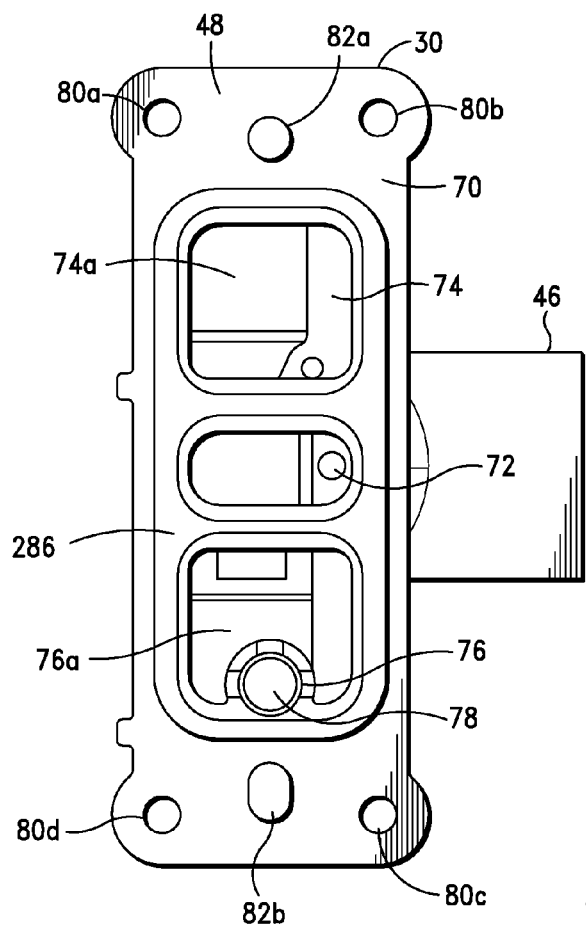
FIG. 7 is a front elevation view of the housing portion of FIG. 5.

As shown in FIGS. 5-7, housing 30 has a generally circular base 40 with an end wall 42 and a side wall 44 integrally formed with and extending from end wall 42. Housing 30 may be formed from any type of material, such as metal or plastic. A cylindrical shaft sleeve 46 is integrally formed with and extends outward from end wall 42 in the opposite direction as side wall 44, and a rectangular manifold 48 is integrally formed with and extends outward from side wall 44. Manifold 48 is oriented in a plane that is generally perpendicular to end wall 42 and tangent to side wall 44. Referring to FIG. 5, three protrusions 50a-c extend outward from side wall 44 and are spaced approximately 90 degrees from each other. Threaded openings 52a-c are formed in protrusions 50a-c, respectively, and another threaded opening 52d is formed in a portion of manifold 48. Openings 52a-d are radially spaced equidistant from the center of end wall 42 and are spaced approximately 90 degrees from each other. Two additional openings 54a-b extend through manifold 48 for receiving bolts 56a-b (FIG. 3) to mount valve assembly 10 to frame rail 16 (FIG. 1).

Referring to FIG. 6, an exhaust port 58 extends from an opening 58a in the center of end wall 42 through shaft sleeve 46. Exhaust port 58 is surrounded by an interior surface 60 of shaft sleeve 46 that includes a plurality of grooves 62 spaced equidistant from each other and extending in the same direction as the longitudinal axis of shaft sleeve 46. A circular recess 64 with a diameter that is larger than exhaust port 58 is formed in an end wall 66 of shaft sleeve 46. A bearing 68 (FIGS. 3 and 4) fits snugly within exhaust port 58 and abuts the interior surface 60 of shaft sleeve 46 between grooves 62. Grooves 62 are in fluid communication with circular recess 64 and the opening 58a of exhaust port 58 in end wall 42 to form a path through which air can exhaust from height control valve assembly 26 as described in detail below.

As shown in FIG. 7, manifold 48 includes an outer surface 70 with first and second ride height ports 72 and 74, and an air supply port 76. The first ride height port 72 includes the following sections that are in fluid communication with each other: a relatively large recess 72a (FIG. 6) within manifold 48, a narrower channel 72b that extends from recess 72a and is positioned behind and parallel to end wall 42, a channel 72c extending generally perpendicular from channel 72b, and an opening 72d (FIG. 5) in end wall 42 where channel 72c terminates. Second ride height port 74 also includes a relatively large recess 74a within manifold 48, a narrower channel (not shown) extending from recess 74a behind and parallel to end wall 42, and a channel (not shown) perpendicular to end wall 42 that terminates in an opening 74b in end wall 42. The openings 72d and 74b of first and second ride height ports 72 and 74, respectively, in end wall 42 are radially spaced equidistant from the exhaust port 58. There is an angle between the openings 72d and 74b that is between approximately 20 to 45 degrees, and in one preferred embodiment is approximately 35 degrees. The opening 72d is centered on a horizontal plane passing through it, exhaust port 58, and openings 52b and 52d, as shown in FIG. 5.

Air supply port 76 extends from a large recess 76a within manifold 48 to a slot-like opening 76b (FIG. 6) in side wall 44. Fluid entering the air supply port 76 from manifold 48 must pass through a check valve 78 positioned within the air supply port 76. Air supply port 76 is in fluid communication with an interior chamber 80 of housing 30 that is defined by end wall 42, side wall 44, and enclosed by cover 32 (FIG. 4). The air supply port 76 is designed to supply pressurized air to interior chamber 80. Check valve 78 prevents air from exiting interior chamber 80 through air supply port 76. Referring to FIG. 7, manifold 48 also includes four threaded openings 80a-d positioned at the corners of surface 70, and two alignment recesses 82a-b.

Cover 32 is generally disc shaped and has four protrusions 84a-d (FIGS. 3 and 4) with openings 86a-d that align with the openings 52a-d (FIG. 5) in housing 30. The aligned openings 86a-d and 52a-d receive screws 88a-d that engage the threaded openings 52a-d to secure the cover 32 to the housing 30. Cover 32 has another pair of openings, one of which is shown in FIG. 3 as 90, that align with the openings 54a-b in housing 30 and receive bolts 56a-b (FIG. 3). Cover 32 includes a ring 92, shown in FIGS. 3 and 4, that is received within interior chamber 80. An o-ring seal 94 is positioned around ring 92 to form a seal between the cover 32 and side wall 44 of housing 30. An outer surface 96 of cover 32 abuts the frame rail 16 (FIG. 1) when the valve assembly 10 is mounted thereon.

Figure 8:
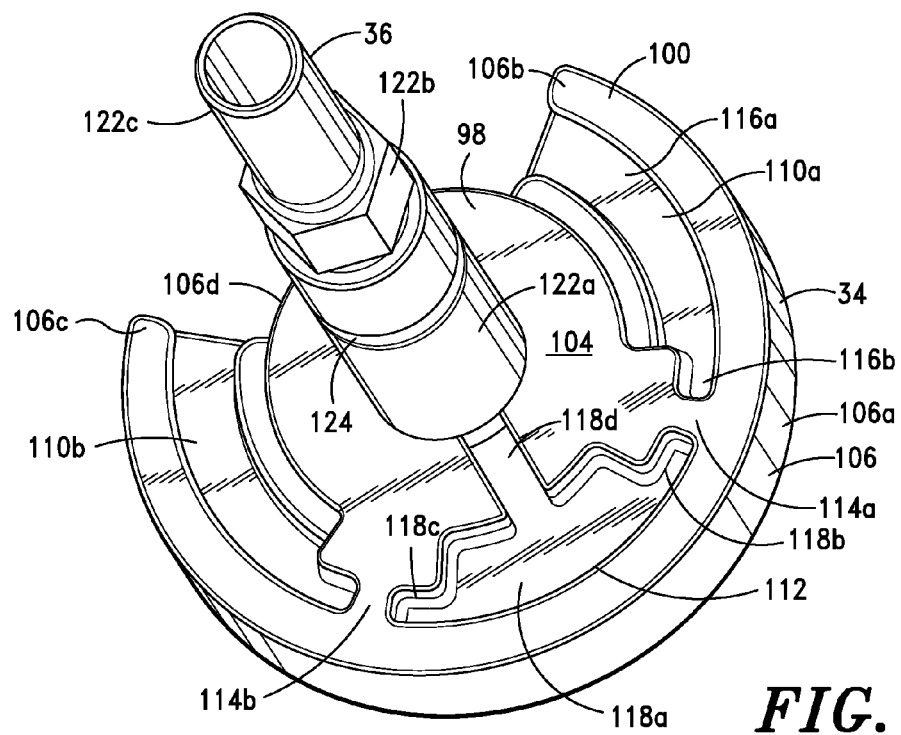
FIG. 8 is a perspective view of a valve disc and shaft of the height control valve assembly.

Rotating disc 34 is positioned within the interior chamber 80 of housing, as shown in FIG. 4, and acts as a valve which controls the flow of air in and out of air spring 14 (FIG. 1). Referring to FIG. 8, disc 34 is joined to one end of shaft 36. Preferably, disc 34 is constructed from a plastic material, such as nylon, acetal, or PEEK, that is overmolded on to the end of shaft 36, which is preferably metal. Disc 34 includes a circular central portion 98 and an outer portion 100 that extends around approximately ⅔ of the central portion 98. Disc 34 includes a first surface 102 (FIG. 4), a second surface 104, and a peripheral edge 106 extending between the first and second surfaces 102 and 104. Peripheral edge 106 includes a section 106a extending around outer portion 100, sections 106b and 106c extending from outer portion 100 to central portion 98, and a section 106d extending around central portion 98. First surface 102 (FIG. 4) includes a central recessed portion 108. Referring to FIG. 8, a pair of fill slots 110a and 110b and an exhaust slot 112 are formed in second surface 104. Fill slots 110a-b are mirror images of each other and positioned on opposite sides of exhaust slot 112. Land regions 114a and 114b of second surface 104 are positioned between fill slots 110a-b and exhaust slot 112, respectively.

Because fill slots 110a and 110b are substantially similar, only fill slot 110a is described in detail herein. Fill slot 110a generally extends circumferentially around the outer portion 100 of disc 34. Fill slot 110a includes a relatively large section 116a extending from the section 106b of peripheral edge 106, and a narrower section 116b extending from the large section 116a to adjacent land 114a. Exhaust slot 112 includes a circumferentially extending base section 118a with approximately the same radial width as section 116a of fill slot 110a, and narrower sections 118b and 118c extending from opposite sides of base section 118a toward lands 114a and 114b, respectively. A channel 118d extends radially from base section 118a to shaft 36.

When positioned within interior chamber 80, as shown in FIG. 4, first surface 102 is in fluid communication with the opening 76b of air supply port 76 (FIGS. 5-7). Pressurized air from air supply port 76 engages the first surface 102 to press second surface 104, and specifically land regions 114a and 114b, into sealing engagement with end wall 42 of housing 30. The fill slots 110a and 110b are in fluid communication with the air supply port 76 because they open to the peripheral edge 106. Channel 118d of exhaust slot 112 is in fluid communication with the opening 58a (FIG. 6) of exhaust port 58, grooves 62, and circular recess 64.

As shown in FIG. 4, shaft 36 has a first end 120a to which disc 34 is joined inside interior chamber 80 and a second end 120b positioned outside of housing 30. Shaft 36 extends from first end 120a to second end 120b through exhaust port 58. Shaft 36 is received by an opening through bearing 68 and rotates with respect to the bearing 68. Referring to FIG. 8, shaft 36 includes a cylindrical first section 122a which is joined to disc 34 and received by bearing 68. A second section 122b of shaft 36 extends outward from first section 122a and includes a hexagonal shaped outer surface. A cylindrical third section 122c extends outward from second section 122b and has a threaded outer surface. A groove 124 extends around the first section 122a and receives an o-ring seal 126 (FIGS. 3 and 4). The o-ring seal 126 engages an inner surface of bearing 68 to prevent air flow between the shaft 36 and bearing 68, which prevents air from blowing out lubricant that is preferably between the shaft 36 and bearing 68. Exhaust air from channel 118d of disc 34 (FIG. 8) passes from channel 118d between shaft 36 and interior surface 60 of shaft sleeve 46 into grooves 62 and circular recess 64.

Referring to FIGS. 3 and 4, lever assembly 38 is joined to the second end 120b of shaft 36. Lever assembly 38 includes a cap 128, v-shaped seal 130, inner and outer arms 132 and 134, a nut 136 joining the assembly 38 to shaft 36, and a rod 138 (FIG. 1) connecting outer arm 132 to axle 24. Cap 128 includes a side wall 140 joined to an end wall 142. A protrusion 144 having a cylindrical outer surface is joined to and extends from end wall 142 to form an annular recess between protrusion 144 and side wall 140. V-shaped seal 130 fits snugly around the outer surface of protrusion 144. An inner surface 146 of protrusion 144 is hexagonal shaped to mate with the second section 122b of shaft 36 and prevent rotation of shaft 36 with respect to cap 128. An opening 148 passes through the center of end wall 142 and protrusion 144 for receiving shaft 36. As shown in FIG. 3, a circular raised section 150 extends outward from end wall 142, and four mounting studs, one of which is shown as 152, extend outward from raised section 150.

As shown in FIG. 3, inner arm 132 has one end in which is formed a cap opening 154 that receives raised section 150 of cap 128. The cap opening 154 permits the inner arm 132 to be mounted to the cap 128 and rotate relative thereto. The inner arm 132 includes a hole 156 at approximately its midpoint. Inner arm 132 includes two sections 158a and 158b joined by an angled section 160. A hole 162 is positioned at the end of section 158b. Outer arm 134 is sized to fit over the section 158a of inner arm 132. Outer arm 134 includes a hole 164 at one end that is sized to receive the third section 122c of shaft 36. Four holes, one of which is shown as 166, surround hole 164 and are positioned to receive the mounting studs 152 of cap 128 so that outer arm 134 does not rotate with respect to cap 128. A slot 168 is positioned at the opposite end of outer arm 134. Slot 168 aligns with the hole 156 in inner arm 132. A bolt 170 is received by slot 168 and hole 156, a washer 172 slides over bolt 170, and a nut 174 (FIG. 4) engages the bolt 170 to secure the inner and outer arms 132 and 134. Nut 136 engages the threaded third section 122c of shaft 36 to secure the lever assembly 38 on the shaft 36.

The inner arm 132 may be rotationally adjusted relative to cap 128 and shaft 36, and fixed to the cap 128 and shaft 36 via its connection to outer arm 134. To adjust the position of inner arm 132 relative to shaft 36, nut 174 (FIG. 4) is loosened from bolt 170. Inner arm 132 may then be rotated relative to handle cap 128 and shaft 36. As inner arm 132 rotates, bolt 170 moves within the slot 168 of outer arm 134. Nut 174 is then tightened on bolt 170 to secure inner and outer arms 132 and 134 together so that they rotate together and with shaft 36. The longitudinal axes of the inner and outer arms 132 and 134 are typically aligned with the horizontal axis of the vehicle 12 (FIG. 1) in a standard mounting. Rotational adjustment of the inner arm 132 relative to the outer arm 134 also includes a corresponding vertical adjustment of the inner arm 132 with respect to the vehicle frame rail 16 and trailing arm 20, effectively providing the height control valve assembly 26 with a height adjustment for the lever assembly 38.

Referring to FIG. 1, rod 138 has one end that is mounted to a bracket 176, which is mounted to axle 24, preferably by welding. Rod 138 extends upward from bracket 176 to another end that is coupled with the end of inner arm 132. Preferably, rod 138 has an L-shaped end (not shown) that is received by the hole 162 (FIG. 3) in the end of inner arm 132. The L-shaped end of rod 138 may be threaded to engage a nut (not shown) that secures the rod 138 to inner arm 132. Alternatively, the L-shaped end of rod 138 may include a hole (not shown) that receives a pin (not shown) to secure the rod 138 to inner arm 132. As trailing arm 20 and axle 24 rotate with respect to frame rail 16, rod 138 moves up and down, which causes rotation of inner arm 132, handle cap 128, shaft 36 and disc 34, shown in FIG. 3. Rod 138 may have an adjustable length to adjust the vertical distance between inner arm 132 and axle 24.

Referring to FIG. 3, v-shaped seal 130 has an opening 178 that is received by the protrusion 144 (FIG. 4) of handle cap 128. As shown in FIG. 4, v-shaped seal 130 includes first and second sections 180a and 180b with a groove 182 formed there between to form a v-shaped cross-section of the seal 130. The first section 180a is positioned adjacent end wall 142 of handle cap 128, and the second section 180b is positioned adjacent end wall 66 of shaft sleeve 46. The second section 180b may abut the end wall 66 or there may be a small gap positioned between second section 180b and end wall 66. When air exhausts from channel 118d of disc 34 (FIG. 8) through grooves 62 and circular recess 64, the air forces the second section 180b of seal 130 to flex toward first section 180a and end wall 142 of handle cap 128 as the air exhausts from the valve assembly 10 through a gap 184 (FIG. 4) between handle cap 128 and shaft sleeve 46.

Figure 9:
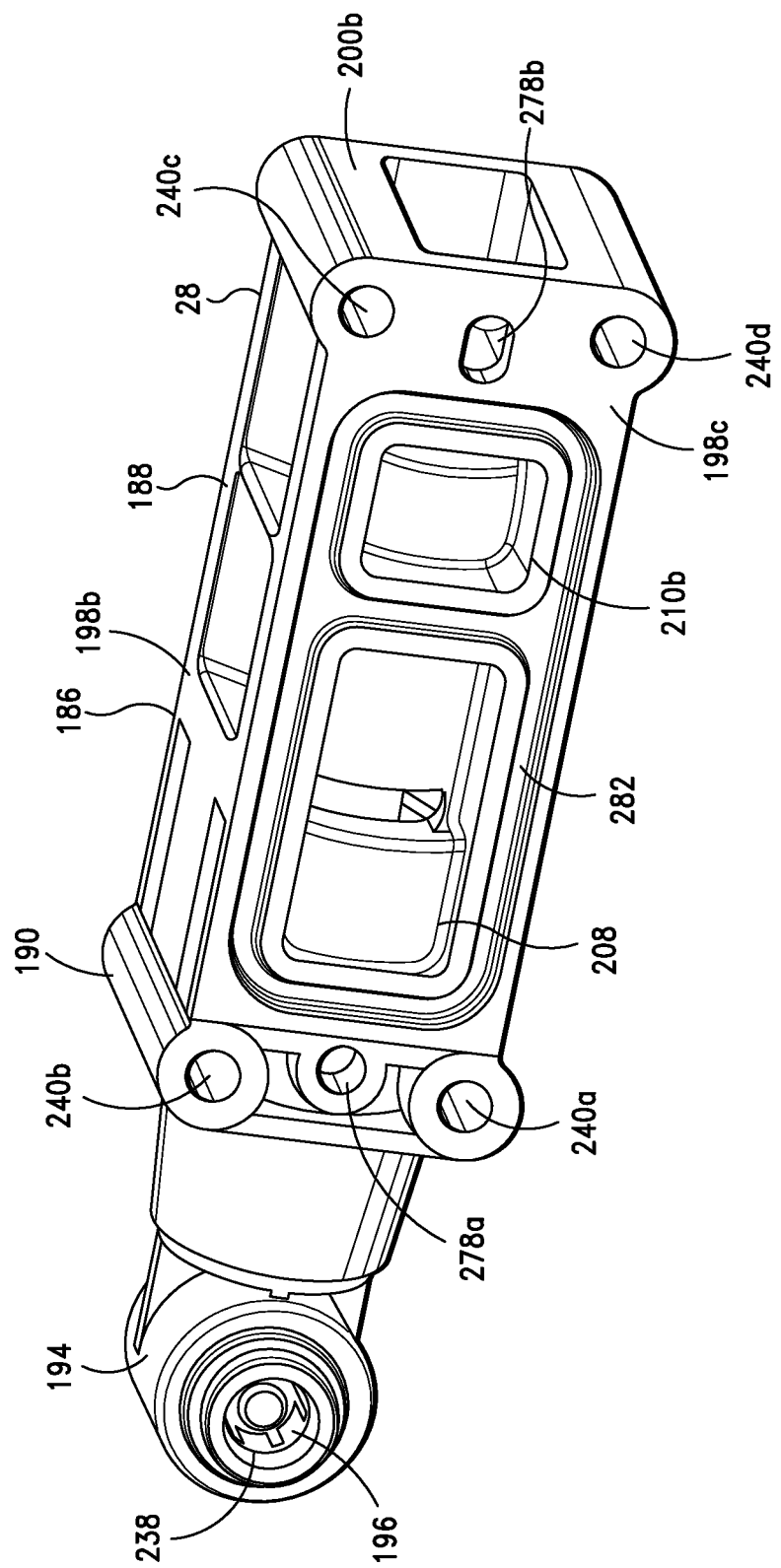
FIG. 9 is a perspective view of a sequencing valve assembly of the valve assembly of FIG. 1.
Figure 10:
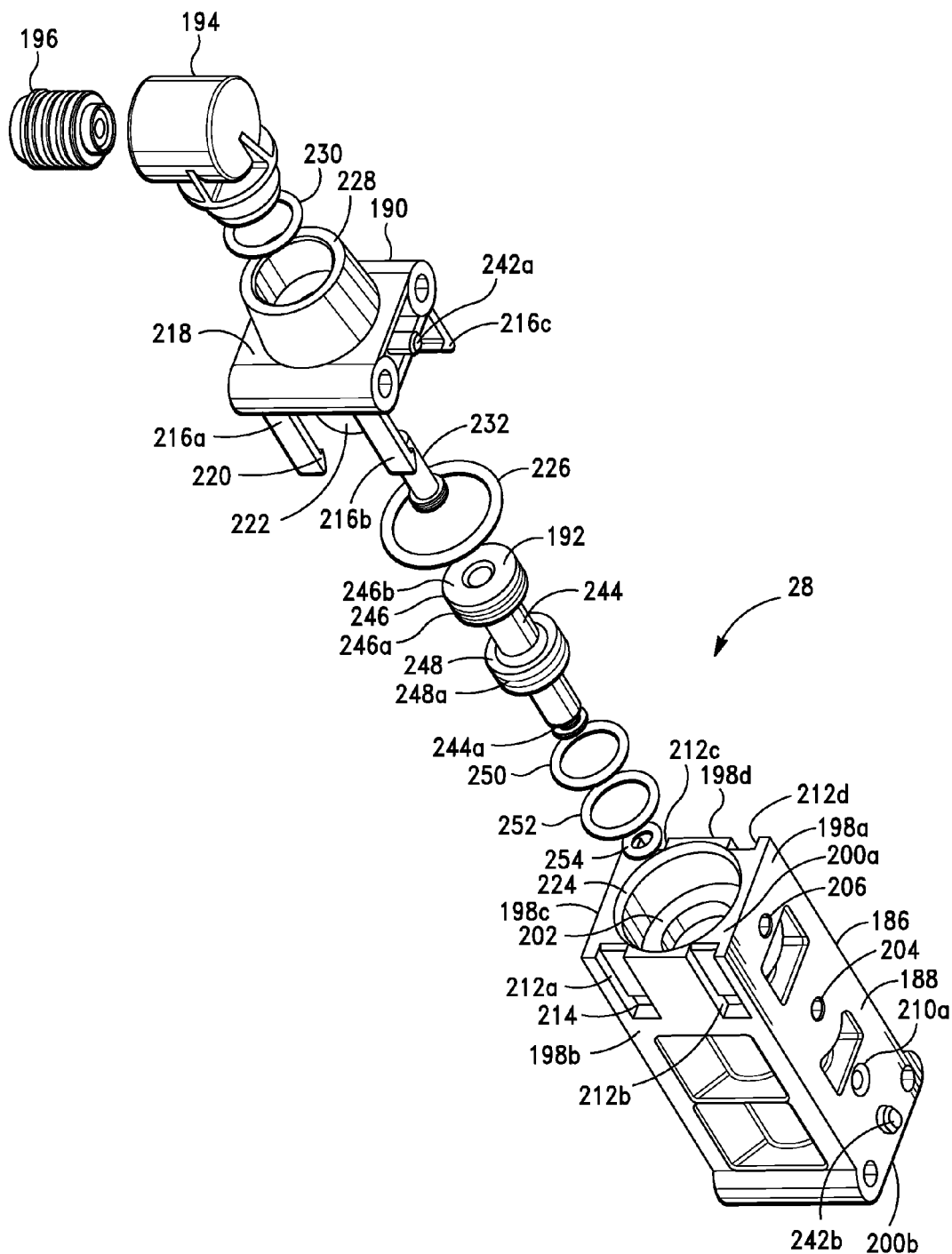
FIG. 10 is an exploded view of the sequencing valve assembly of FIG. 9.
Figure 11A:
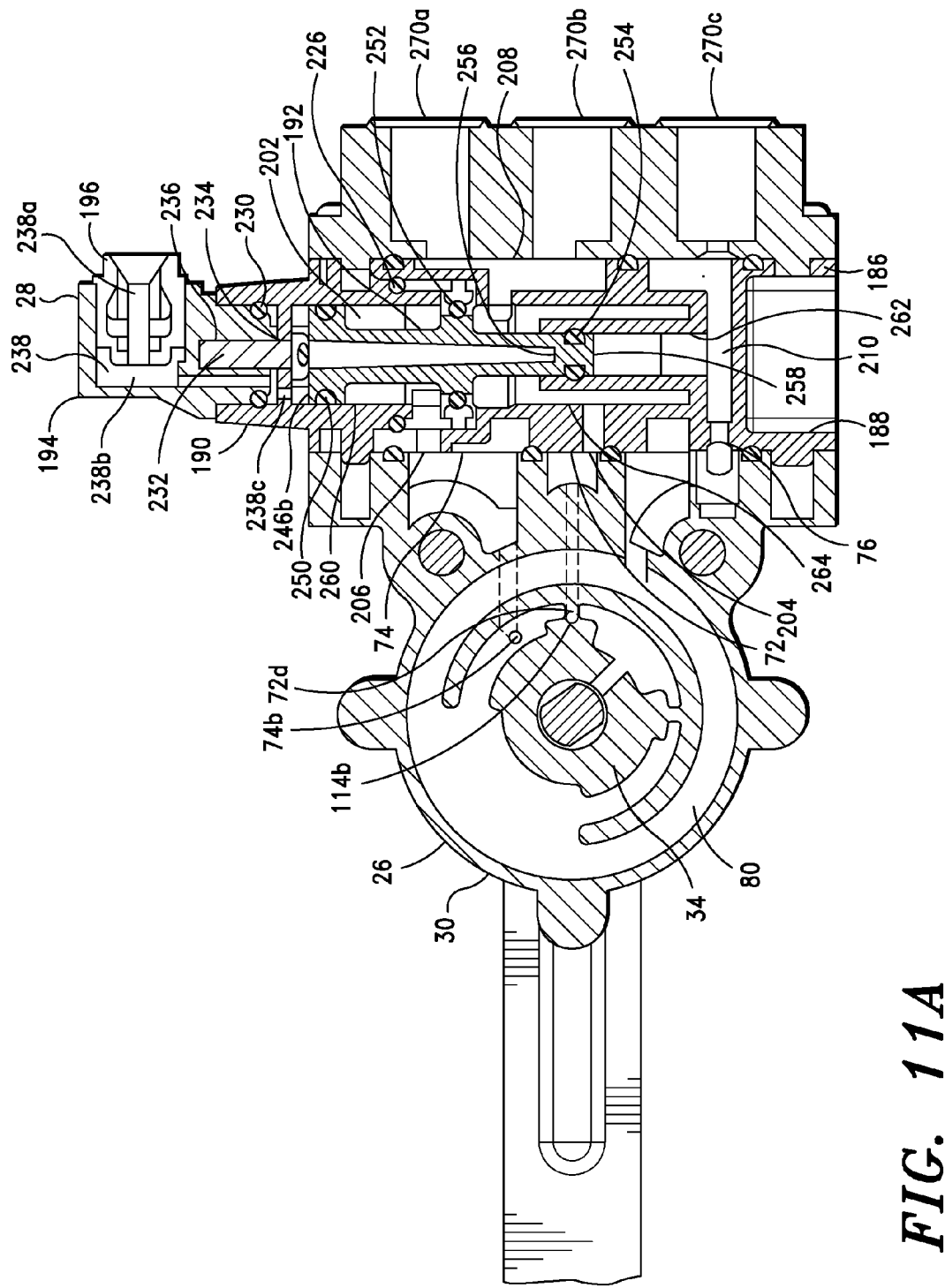
FIG. 11A is a cross-sectional view showing the sequencing valve assembly in a first ride height position and the height control valve assembly in a neutral position.

As shown in FIGS. 9, 10 and 11A, sequencing valve assembly 28 includes a housing 186 with a base 188 and top 190, a valve 192 positioned within housing 186, an elbow 194 joined to top 190, and a push to connect fitting 196 positioned within elbow 194. Base 188 includes generally rectangular side walls 198a-d integrally joined with end walls 200a-b. The side walls 198a-d and end walls 200a-b define an interior chamber 202 within which valve 192 is positioned. Side wall 198a includes first and second ride height ports 204 and 206 each of which are in fluid communication with the interior chamber 202. Side wall 198c (FIG. 9) includes an air spring port 208 that is in fluid communication with the interior chamber 202. Base 188 includes an air supply channel 210 (FIG. 11A) with an opening 210a (FIG. 10) in side wall 198a and an opening 210b (FIG. 9) in side wall 198c.

The top of base 188 includes four channels 212a-d, two of which extend from end wall 200a down side wall 198b and two of which extend from end wall 200a down side wall 198d. Each of the channels 212a-d includes a detent, one of which is shown as 214, at the end of the channel. Top 190 includes four fingers, three of which are shown in FIG. 10 as 216a-c, extending downward from the corners of a rectangular base 218. Fingers 216a-c are received by the channels 212a-d. Each of the fingers 216a-c includes a protrusion 220 that is received within the detent 214 to snap fit the top 190 to base 188.

Top 190 includes a tubular lower protrusion 222 that is received by an opening 224 in the end wall 200a of base 188. A seal 226 fits around protrusion 222 to form a seal between top 190 and base 188. Top 190 includes a tubular upper protrusion 228 extending upward from base 218. A lower portion of elbow 194 is received by upper protrusion 228. A seal 230 fits around the lower portion of elbow 194 to form a seal between the elbow 194 and top 190. Referring to FIG. 11A, a bolt 232 is inserted through an opening 234 in base 218 and engages a threaded opening 236 in elbow 194 to secure the elbow 194 to top 190. Push to connect fitting 196 is positioned in an upper portion of elbow 194. Elbow 194, fitting 196, and top 190 form a control port 238, which includes a channel 238a through fitting 196, a channel 238b through elbow 194, and an opening 238c in base 218. Push to connect fitting 196 is preferably connected to an air hose (not shown) that delivers pressurized air to control port 238 when desired.

As shown in FIG. 9, four holes 240a-d are formed through the corners of housing 186. The holes 240a-d align with the holes 80a-d (FIG. 7) of housing 30. Referring to FIG. 10, housing 186 includes upper and lower protrusions 242a-b that are received by alignment recesses 82a-b (FIG. 7) of housing 30.

Referring to FIG. 10, valve 192 is a spool that includes a cylindrical central section 244, an annular first flange 246 joined to one end of the central section 244, and an annular second flange 248 joined to a midportion of the central section 244. A groove 246a in the first flange 246 receives an o-ring seal 250, a groove 248a in the second flange 248 receives an o-ring seal 252, and a groove 244a in an end of the central section 244 receives an o-ring seal 254. Referring to FIG. 11A, an upper surface 246b of flange 246 and an interior surface 256 are in fluid communication with control port 238. A lower surface 258 of central section 244 is in fluid communication with air supply channel 210. Seal 250 forms a seal between first flange 246 and an interior surface 260 of top 190 to prevent fluid flow between control port 238 and the first and second ride height ports 204 and 206 and air spring port 208. Seal 254 forms a seal between central section 244 and an interior surface 262 of base 188 to prevent fluid flow between air supply channel 210 and the first and second ride height ports 204 and 206 and air spring port 208.

Valve 192 controls fluid flow between the first and second ride height ports 204 and 206 and the air spring port 208. Valve 192 is moveable between a first ride height position, shown in FIG. 11A, in which the first ride height port 204 is in fluid communication with the air spring port 208, and a second ride height position, shown in FIG. 11D, in which the second ride height port 206 is in fluid communication with the air spring port 208. In the first ride height position, shown in FIG. 11A, seal 252 engages an interior surface 264 of base 188 to prevent fluid flow between second ride height port 206 and air spring port 208. In the second ride height position, shown in FIG. 11D, seal 252 is moved downward from the first ride height position and engages interior surface 264 to prevent fluid flow between the first ride height port 204 and air spring port 208.

The pressure within control port 238 exerts a downward control force on valve 192 that is equal to the pressure within control port 138 times the combined surface area of upper surface 246b and interior surface 256 of valve 192. The pressure within air supply channel 210 exerts an upward biasing force on valve 192 that is equal to the pressure within air supply channel 210 times the surface area of lower surface 258 of valve 192. Valve 192 is in the first ride height position, shown in FIG. 11A, when the downward control force is less than the upward biasing force. Valve 192 is in the second ride height position, shown in FIG. 11D, when the downward control force is greater than the upward biasing force. Preferably, in operation, air supply channel 210 remains pressurized to bias valve 192 to the first ride height position, and control port 238 is selectively pressurized in order to overcome the upward biasing force and move the valve 192 to the second ride height position when desired. The surface area of upper surface 246b and interior surface 256 of valve 192 is preferably greater than the surface area of lower surface 258 of valve 192 such that when control port 238 and air supply channel 210 are at the same pressure, the valve 192 is in the second ride height position.

Valve assembly 10 includes a manifold cover 266, shown in FIG. 3, with a rectangular base 268 and three circular hose connections 270a-c extending outward from the base 268. Hose connections 270a-b include openings that are in fluid communication with the air spring port 208 of sequencing valve assembly 28. Hose connection 270c includes an opening that is in fluid communication with the air supply channel 210 of sequencing valve assembly 28. One of hose connections 270a-b is in fluid communication with air spring 14 (FIG. 1) via an air hose (not shown), and the other hose connection 270a-b is preferably in fluid communication with another air spring (not shown) of vehicle 12. Hose connection 270c is in fluid communication with an air supply tank (not shown) of vehicle 12 via an air hose (not shown). Preferably, the hose connections 270a-c are capable of being coupled with conventional air hose couplings. Manifold cover 266 may include only one of hose connections 270a-b that is in fluid communication with air spring port 208 if the valve assembly 10 is only connected to a single air spring 14. It is also within the scope of the present invention for the manifold cover to have more than two hose connections 270a-b that are in fluid communication with air spring port 208 if the valve assembly 10 is connected to more than two air springs 14.

Manifold cover 266 includes four holes 272a-d at its corners that are aligned with the holes 240a-d of sequencing valve assembly 28 and the holes 80a-d (FIG. 7) of housing 30. The aligned holes 272a-d, 240a-d, and 80a-d receive bolts 274a-d that engage the threads of holes 80a-d in housing 30 to secure the manifold cover 266 and sequencing valve assembly 28 to the height control valve assembly 26. Manifold cover 266 includes two alignment protrusions 276a-b that are received by alignment recesses 278a-b (FIG. 9) in sequencing valve assembly 28. A gasket 280 (FIG. 3) is received by a groove 282 (FIG. 9) in sequencing valve assembly 28 to seal between the manifold cover 266 and sequencing valve assembly 28. A gasket 284 (FIG. 3) is received by a groove 286 (FIG. 7) in housing 30 to seal between the sequencing valve assembly 28 and housing 30.

In operation, when vehicle 12 (FIG. 1) is at its first ride height, valve assembly 10 begins with the height control valve assembly 26 in the neutral position shown in FIG. 11A and the sequencing valve assembly 28 in the first ride height position. When in this position, land 114b of disc 34 covers opening 72d of first ride height port 72. Pressurized air supplied through hose connection 270c flows through air supply channel 210 and air supply port 76 to fill the interior chamber 80 of housing 30 and press the land 114b of disc 34 into sealing engagement with the end wall 42 of housing 30 surrounding first ride height port 72. This prevents air flow in to or out of air spring 14, which is connected to one of hose connections 270a-b, through first ride height port 72 of housing 30, first ride height port 204 of sequencing valve 28, and air spring port 208. Sequencing valve assembly 28 is in the first ride height position, in which seal 252 on valve 192 prevents air flow in to or out of air spring 14 through second ride height port 206 of sequencing valve assembly 28 and second ride height port 74 of housing 30. When height control valve assembly 26 is in the neutral position and sequencing valve assembly 28 is in the first ride height position, inner arm 132 of lever assembly 38 is preferably horizontal as shown in FIG. 1.

Figure 11B:
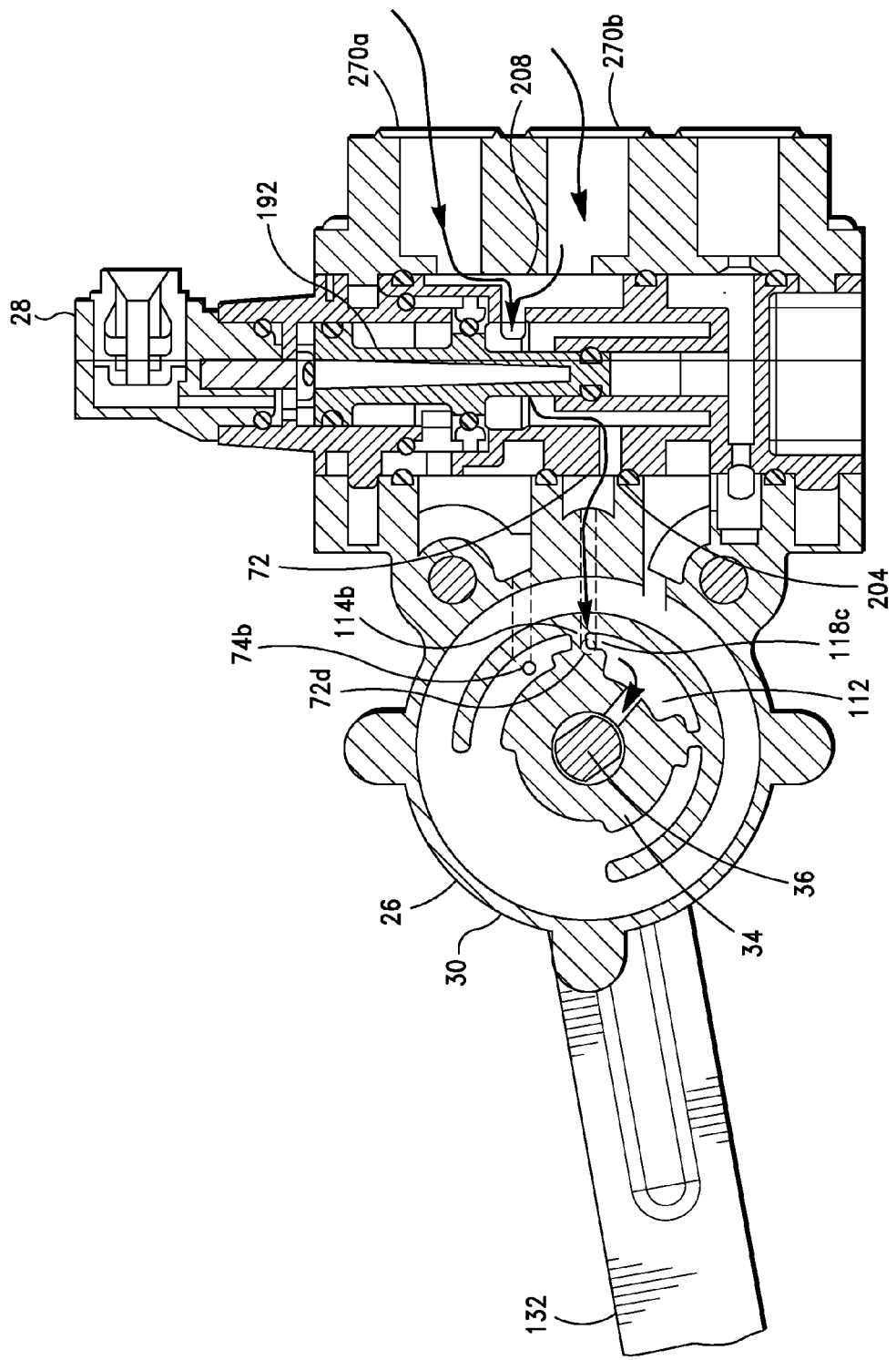
FIG. 11B is a cross-sectional view showing the sequencing valve assembly in a first ride height position and the height control valve assembly in an exhaust position.

Referring to FIG. 1, if trailing arm 20 rotates with respect to the frame rail 16 of vehicle 12 such that frame rail 16 moves away from axle 24, such as when a load is removed from vehicle 12, rod 138 pulls the end of inner arm 132 downward. This causes the inner arm 132 to rotate in a clockwise direction, as viewed in FIG. 1, with respect to housing 30. As shown in FIG. 11B, rotation of inner arm 132 also causes rotation of shaft 36 and disc 34 in a counter-clockwise direction, as viewed in FIG. 11B, to an exhaust position. As disc 34 rotates from the neutral position to the exhaust position, land 114b rotates away from the opening 72d of first ride height port 72 and the opening 72d is placed in fluid communication with the narrow section 118c of the exhaust slot 112 of disc 34. Rotation of the disc 34 places air spring 14 (FIG. 1) in fluid communication with the exhaust slot 112 via one of the hose connections 270a-b connected to the air spring 14, air spring port 208, first ride height port 204 of sequencing valve 28, and first ride height port 72 of housing 30. Air from the air spring 14 exhausts from the height control valve assembly 26 by passing from the exhaust slot 112 through the grooves 62 (FIG. 6) of housing 30 to circular recess 64. The exhaust air then forces v-shaped seal 130 (FIG. 4) to flex as described above and passes through the gap 184 between cap 128 and shaft sleeve 46 to exit the valve assembly 10. As air exhausts from the air spring 14 (FIG. 1), trailing arm 20 rotates with respect to the vehicle frame 16 to move axle 24 closer to the vehicle frame 16. Rotation of trailing arm 20 moves the rod 138 upward, which causes inner arm 132, shaft 36 and disc 34 to rotate back to the neutral position shown in FIG. 11A. When disc 34 moves back to the neutral position, air is no longer exhausted from air spring 14, and vehicle 12 is back at its first ride height.

Figure 11C:
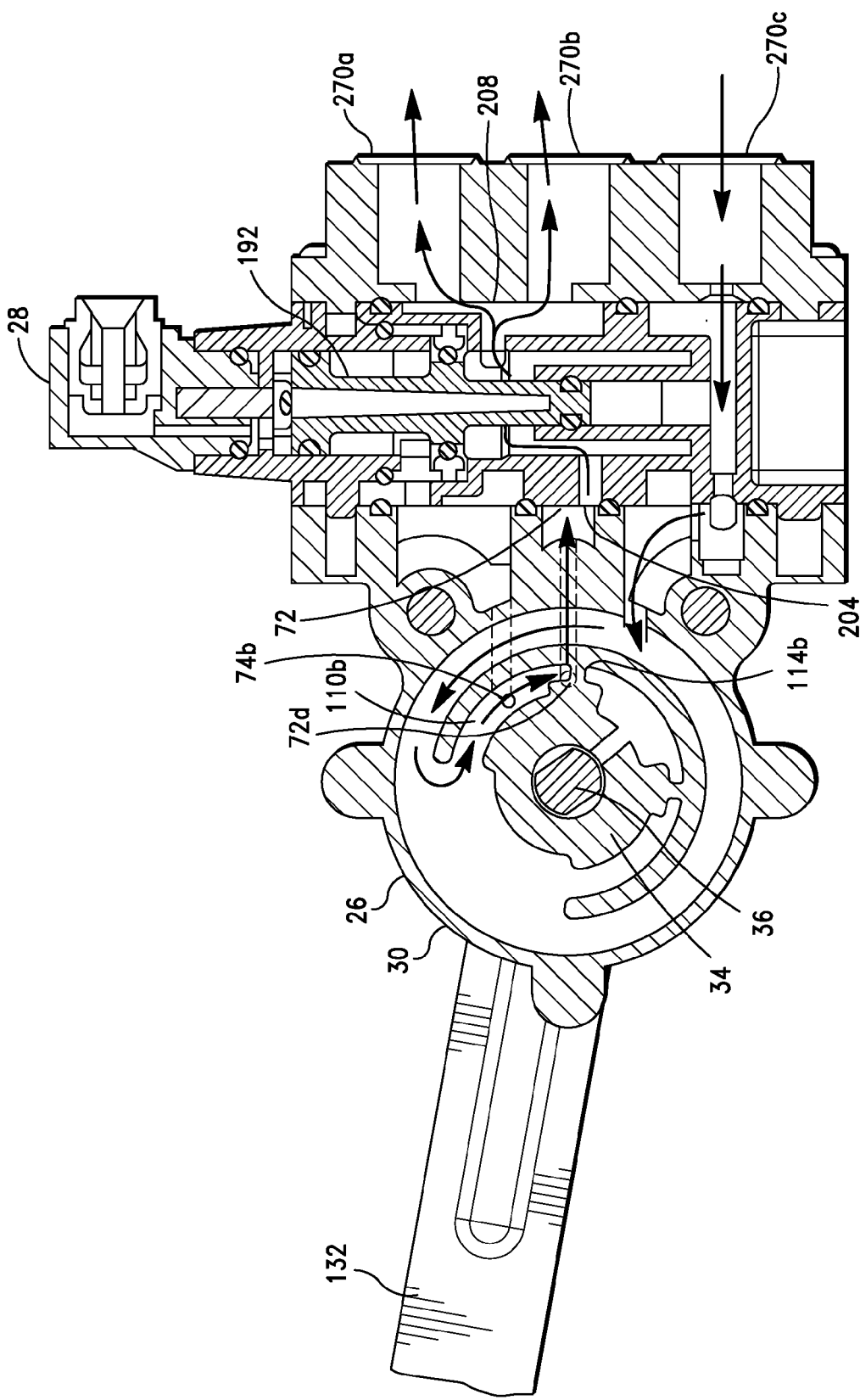
FIG. 11C is a cross-sectional view showing the sequencing valve assembly in a first ride height position and the height control valve assembly in a fill position.

If instead trailing arm 20 rotates with respect to the frame rail 16 of vehicle 12 such that frame rail 16 moves toward axle 24, such as when a load is added to vehicle 12, rod 138 pushes the end of inner arm 132 upward. This causes the inner arm 132 to rotate in a counter-clockwise direction, as viewed in FIG. 1, with respect to housing 30. As shown in FIG. 11C, rotation of inner arm 132 also causes rotation of shaft 36 and disc 34 in a clockwise direction, as viewed in FIG. 11B, to a fill position. As disc 34 rotates from the neutral position to the fill position, land 114b rotates away from the opening 72d of first ride height port 72 and the opening 72d is placed in fluid communication with the fill slot 110b of disc 34. Rotation of the disc 34 places air spring 14 (FIG. 1) in fluid communication with the fill slot 110b via one of the hose connections 270a-b connected to the air spring 14, air spring port 208, first ride height port 204 of sequencing valve 28, and first ride height port 72 of housing 30. Pressurized air within the interior chamber 80 of housing 30, which is supplied through hose connection 270c, fills the air spring 14 by flowing through fill slot 110b, first ride height port 72, first ride height port 204 of sequencing valve 28, and hose connections 270a-b. As air fills the air spring 14 (FIG. 1), trailing arm 20 rotates with respect to the vehicle frame 16 to move axle 24 away from the vehicle frame 16. Rotation of trailing arm 20 moves the rod 138 downward, which causes inner arm 132, shaft 36 and disc 34 to rotate back to the neutral position shown in FIG. 11A. When disc 34 moves back to the neutral position, air no longer fills the air spring 14 and vehicle 12 is back at its first ride height.

Figure 11D:
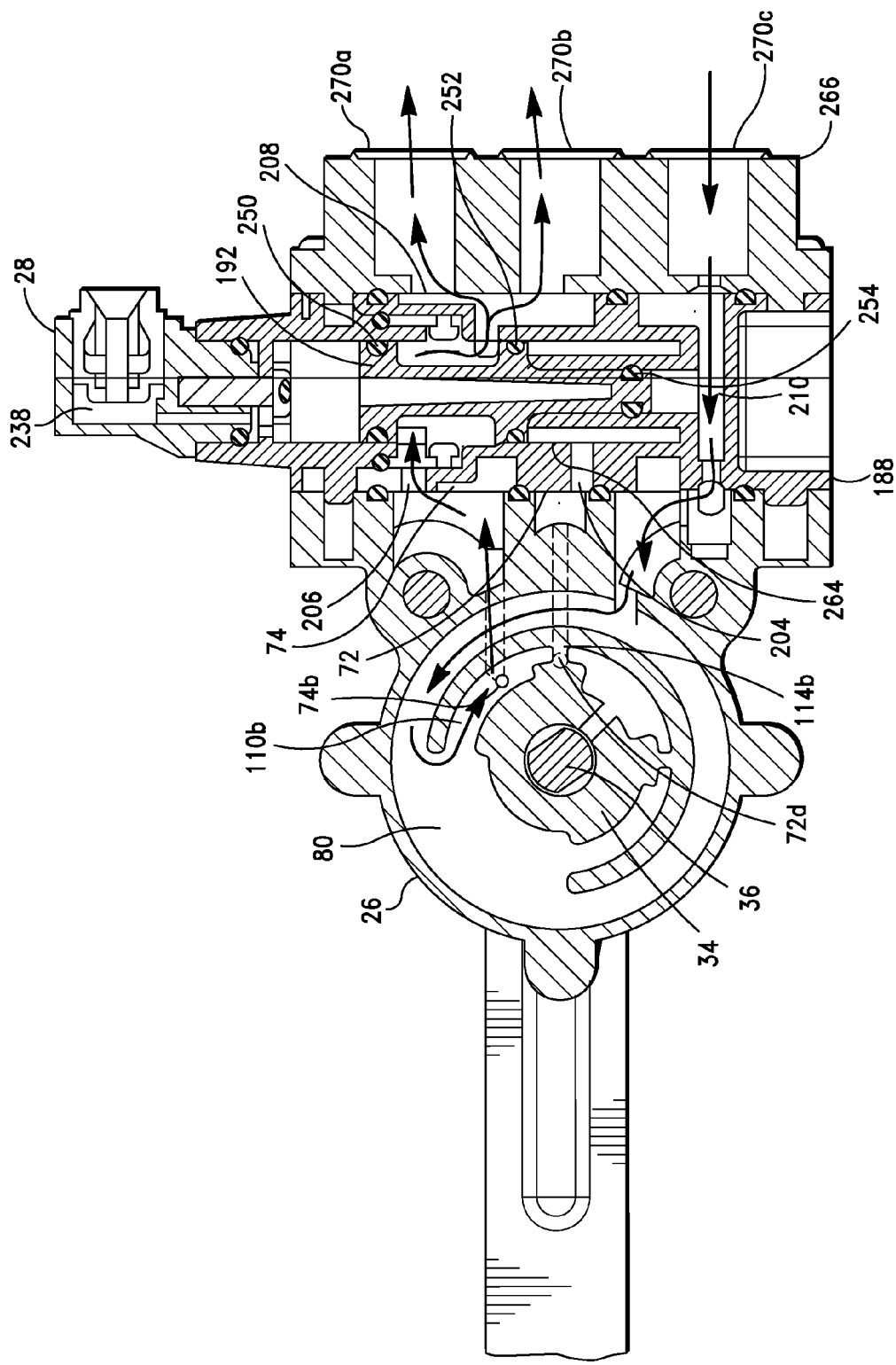
FIG. 11D is a cross-sectional view showing the sequencing valve assembly in a second ride height position and the height control valve assembly in a fill position.

The ride height of vehicle 12 may be changed from the first ride height to the second ride height by supplying pressurized air to control port 238, as described above, to move the valve 192 within sequencing valve assembly 28 to the second ride height position shown in FIG. 11D. When valve 192 is moved to the second ride height position, seal 252 on valve 192 seals first ride height port 72 of housing 30 and first ride height port 204 of sequencing valve assembly 28 from air spring port 208, hose connections 270a-b, and air spring 14. Second ride height port 74 of housing 30 and second ride height port 206 of sequencing valve assembly 28 are placed in fluid communication with air spring port 208, hose connections 270a-b, and the air spring 14 (FIG. 1) connected to one of the hose connections 270a-b. As shown in FIG. 11D, opening 74b of second ride height port 74 is in fluid communication with fill slot 110b of disc 34 and interior chamber 80 of housing 30. This causes pressurized air within the interior chamber 80 of housing 30, which is supplied through hose connection 270c, to fill the air spring 14 by flowing through fill slot 110b, second ride height port 72, second ride height port 204 of sequencing valve 28, and hose connections 270a-b. As air fills the air spring 14 (FIG. 1), trailing arm 20 rotates with respect to the vehicle frame 16 to move axle 24 away from the vehicle frame 16. Rotation of trailing arm 20 moves the rod 138 downward, which causes inner arm 132, shaft 36 and disc 34 to rotate X degrees to the neutral position shown in FIG. 11E. In the neutral position of second ride height, land 114b covers opening 74b to prevent air from flowing in to or out of air spring 14.

Figure 11E:
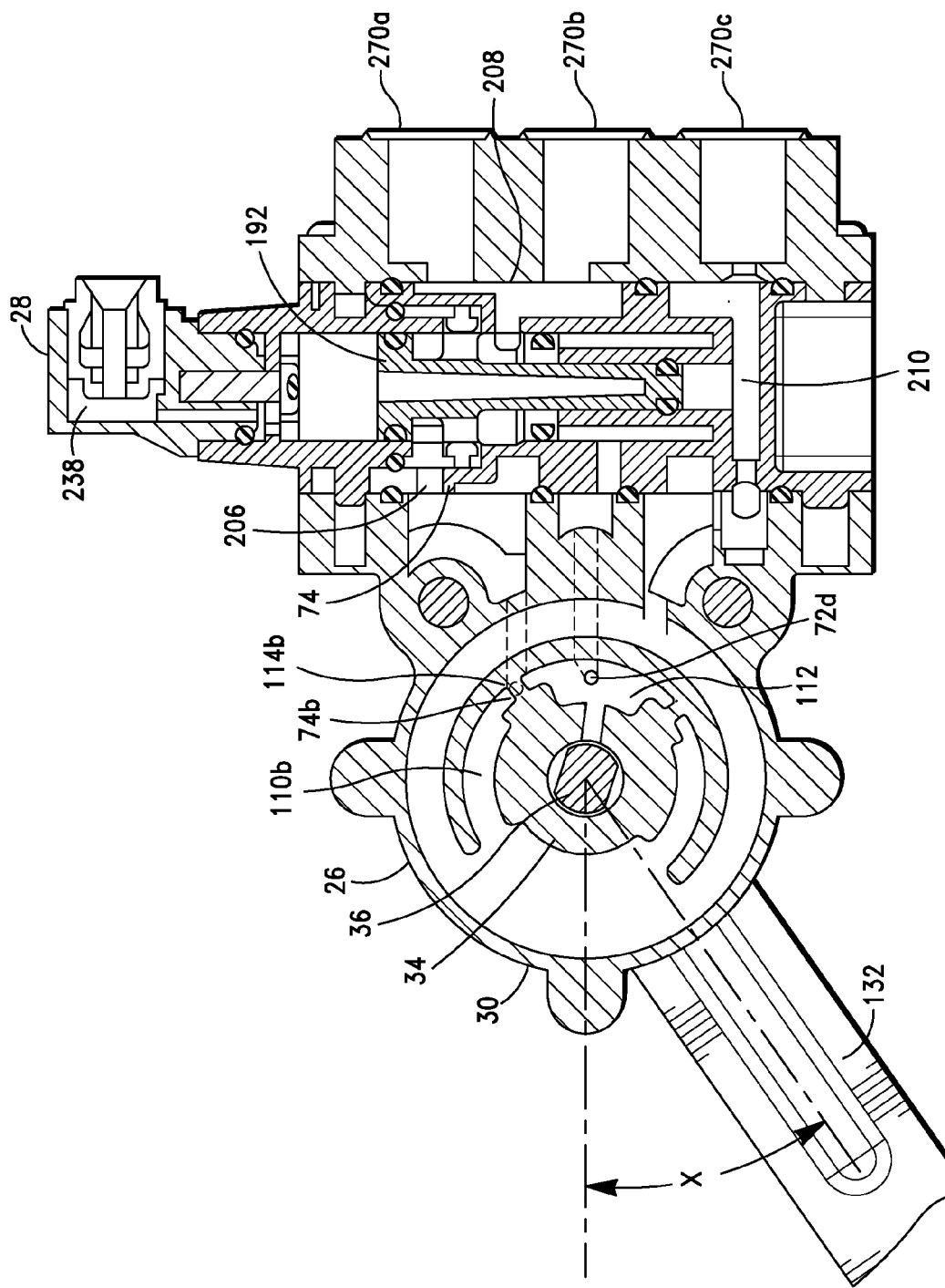
FIG. 11E is a cross-sectional view showing the sequencing valve assembly in a second ride height position and the height control valve assembly in a neutral position.

When valve assembly 10 is oriented as shown in FIG. 11E, the second ride height of vehicle 12 is higher than the first ride height because the opening 74b of second ride height port 74 is positioned within the fill slot 110b when the sequencing valve assembly is in the first ride height position, as shown in FIG. 11A. As described below in connection with FIGS. 12A and 12B, it is also possible to orient valve assembly 10 so that the second ride height is lower than the first ride height. The difference in height between the first and second ride heights is determined by the angle X (FIG. 11E), which represents the angle between the openings 72d and 74b of first and second ride height ports 72 and 74, and the length of inner arm 132 of lever assembly 38. As angle X increases and/or as the length of inner arm 132 increases, the difference in height between the first and second ride heights increases. Preferably, the angle X is between approximately 20 to 45 degrees and the length of inner arm 132 is between approximately 5 to 9 inches. Preferably, the difference between the first and second ride heights is between approximately 2.5 to 4 inches.

When the sequencing valve 28 is in the second ride height position and the height control valve assembly 26 is in the neutral position, as shown in FIG. 11E, disc 34 rotates from the neutral position to an exhaust position when axle 24 (FIG. 1) moves away from vehicle frame 16. This places opening 74b in fluid communication with exhaust slot 112 to exhaust air from air spring 14, in the same manner as described above with respect to the first ride height position. Air exhausts from air spring 14 until the vehicle 12 returns to the second ride height and land 114b covers opening 74b. Likewise, disc 34 rotates from the neutral position to a fill position when axle 24 moves toward vehicle frame 16. This places opening 74b in fluid communication with fill slot 110b to fill air spring 14, in the same manner as described above with respect to the first ride height position. Air spring 14 is filled until the vehicle returns to the second ride height and land 114b covers opening 74b.

Figure 11F:
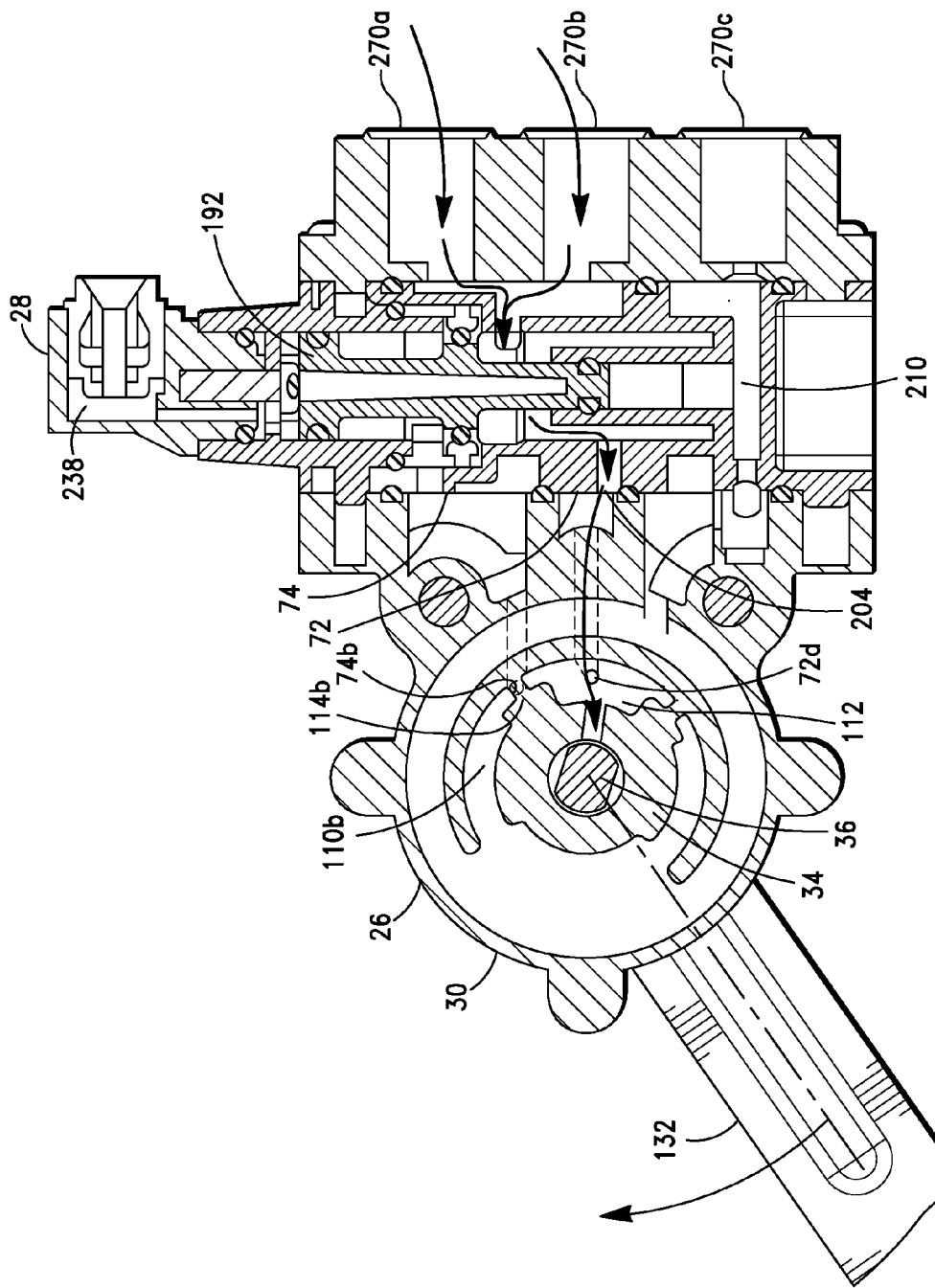
FIG. 11F is a cross-sectional view showing the sequencing valve assembly in a first ride height position and the height control valve assembly in an exhaust position.

To move vehicle 12 from the second ride height back to the first ride height, the flow of pressurized air to control port 238 is stopped, which causes the air within air supply channel 210 to move valve 192 upward to its first ride height position. In the first ride height position, opening 72d of first ride height port 72 is placed in fluid communication with air spring 14, as described above. Because the opening 72d is positioned within the exhaust slot 112 of disc 34 when the vehicle 12 is at the second ride height, as shown in FIG. 11F, air exhausts from air spring 14 through the second ride height port 72 when the valve 192 is moved to its first ride height position. The air exhausts from air spring 14 in the same manner described above with respect to the exhaust position of disc 34. As the air exhausts from air spring 14, vehicle 12 lowers to the first ride height and disc 34 moves back to the neutral position shown in FIG. 11A, in which land 114b covers opening 72d.

Figure 12A:
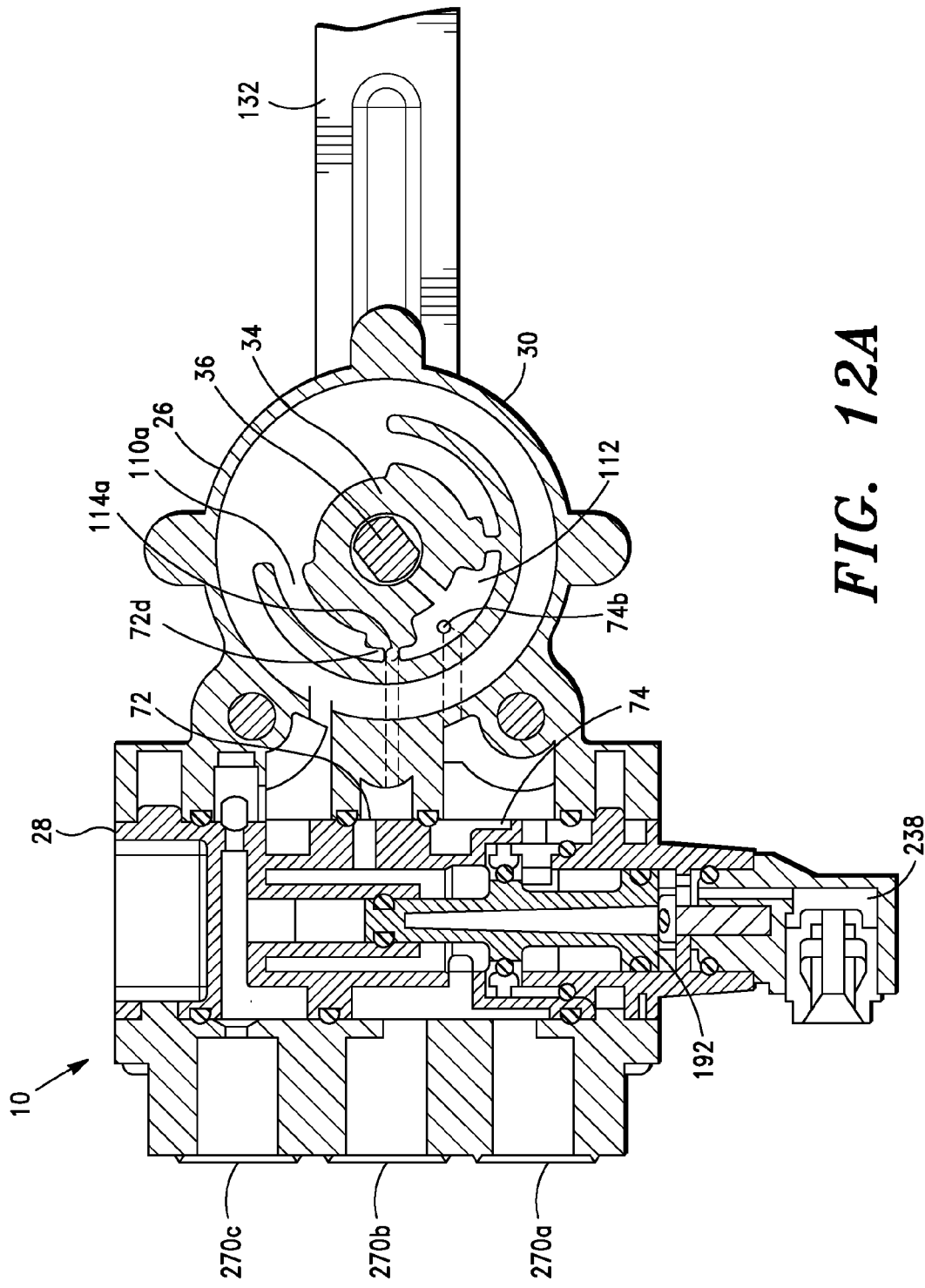
FIG. 12A is a cross-sectional view of an alternative orientation of the valve assembly of FIG. 1 showing the sequencing valve assembly in a first ride height position and the height control valve assembly in a neutral position.
Figure 12B:
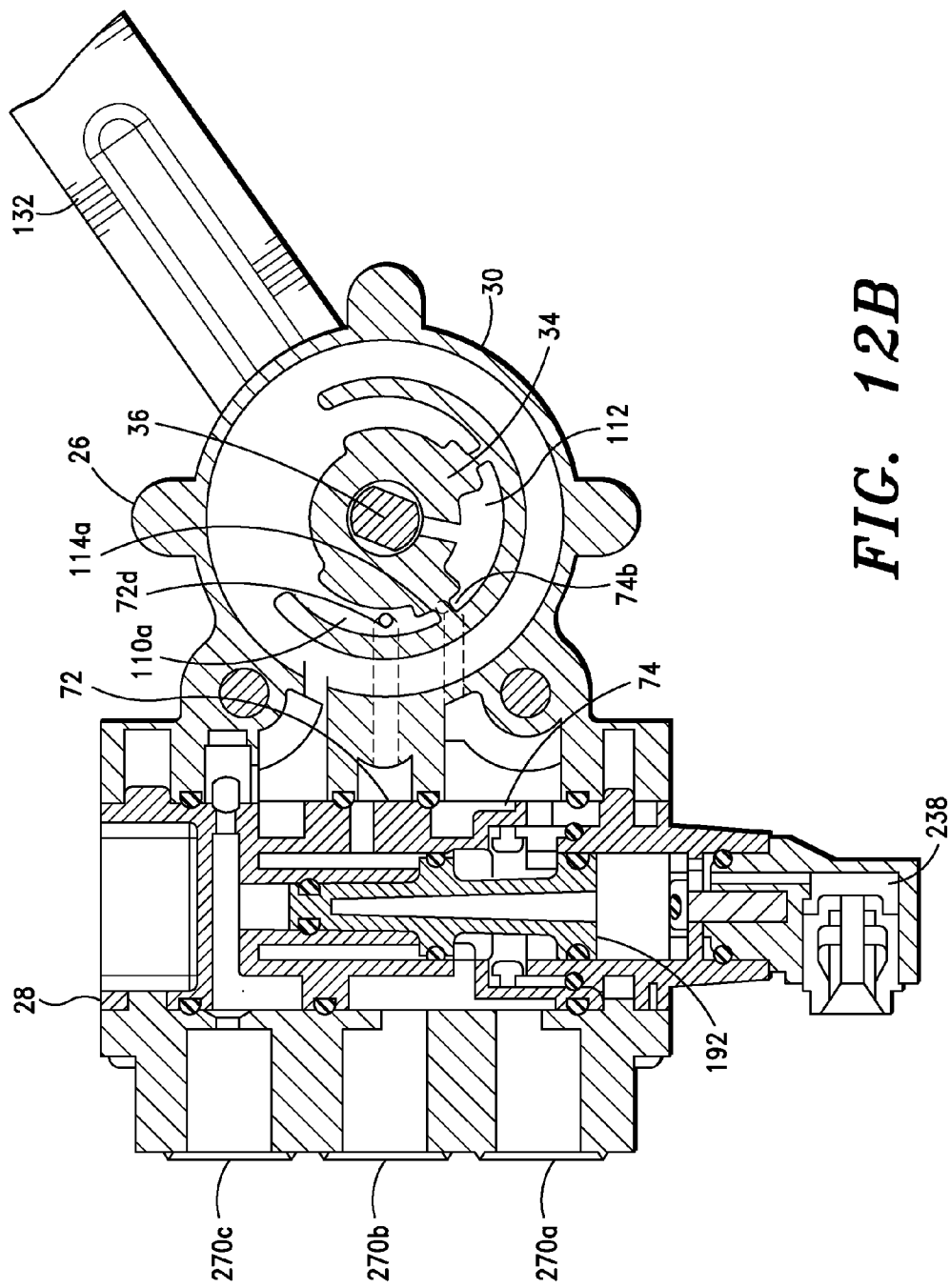
FIG. 12B is a cross-sectional view of the alternative orientation of the valve assembly of FIG. 12A showing the sequencing valve assembly in a second ride height position and the height control valve assembly in a neutral position.

Referring now to FIGS. 12A and 12B, an alternative orientation of valve assembly 10 is shown in which the second ride height is lower than the first ride height. In FIGS. 12A and 12B, the entire valve assembly 10 is rotated 180 degrees from the orientation shown in FIGS. 1 and 11A-F, and the shaft 36 and disc 34 are rotated 90 degrees counter-clockwise, when viewed in FIG. 12A, with respect to inner arm 132. In this orientation, when the height control valve assembly 26 is in the neutral position and the sequencing valve assembly 28 is in the first ride height position, land 114a of disc 34 covers opening 72d of first ride height port 72 to prevent air from flowing in to or out of air spring 14. If the vehicle 12 is unloaded and rises, disc 34 rotates to place exhaust slot 112 in fluid communication with opening 72d to exhaust air from air spring 14 in a similar manner as described above with respect to the orientation shown in FIGS. 11A-F. If the vehicle 12 is loaded and lowers, disc 34 rotates to place fill slot 110a in fluid communication with opening 72d to fill air spring 14 with air in a similar manner as described above with respect to the orientation shown in FIGS. 11A-F.

When it is desired to lower vehicle 12 to the second ride height, pressurized air is supplied to control port 238 to move valve 192 to the second ride height position, shown in FIG. 12B. When the valve 192 is moved to the second ride height position, opening 74b of second ride height port 74 is placed into fluid communication with air spring 14 via hose connections 270a-b. Because the opening 74b is in fluid communication with exhaust slot 112 when the valve 192 is in the first ride height position, air is exhausted from the air spring 14 after the valve 192 is moved to the second ride height position. This causes vehicle 12 to lower to the second ride height position. The vehicle 12 lowers until land 114a covers opening 74b as shown in FIG. 12B. Disc 34 rotates from the position shown in FIG. 12B to a fill position and exhaust position in the same manner described above with respect to the first ride height position to fill or exhaust air from air spring 14.

To raise vehicle 12 back to the first ride height, control port 238 is no longer supplied with pressurized air so that valve 192 moves back to the first ride height position. This places opening 72d in fluid communication with air spring 14 via hose connections 270a-b. Opening 72d is in fluid communication with fill slot 110a when valve moves back to the first ride height position, which causes air to fill air spring 14 As air spring 14 fills, vehicle 12 raises back up to the first ride height, and disc 34 rotates to the position shown in FIG. 12A.

Pressurized air may be automatically supplied to the control port 238 of sequencing valve assembly 28 to move the valve 192 from the first ride height position to the second ride height position upon occurrence of a particular event. For example, if vehicle 12 is a bus, when a door of the bus opens for passengers to board the bus, air may be automatically supplied to control port 238 to move the valve 192 to the second ride height position and lower the bus. When the door closes, the air supply to control port 238 may be cut off so that the valve 192 moves back to its first ride height position and the bus raises. In one embodiment, if vehicle 12 is a semi-tractor, an operator may push a button or pull a lever to control the supply of air to control port 238. The operator may supply air to the control port 238 to lower the semi-tractor to its second ride height when connecting a trailer to the semi-tractor. The operator may stop the supply of air to control port 238 to raise the semi-tractor before it is driven. With conventional height control valves that do not have dual ride heights, all of the air within a semi-tractor's air springs is typically exhausted in order to lower the semi-tractor for connection to a trailer. Exhausting all of the air from the air springs causes the air springs to rub against the frame rail and trailing arm of the vehicle which makes them wear out and prematurely fail.

By using valve assembly 10, the semi-tractor can be lowered to a desirable second ride height without exhausting all of the air from the air springs. Thus, valve assembly 10 prevents premature failure of the air springs. A single valve assembly 10 may be mounted to the vehicle 12 to control the distance between the frame rail 16 and trailing arm 20 for each of the vehicle's wheels, or a single valve assembly 10 may be used for each of the vehicle's axles 24.

Referring to FIG. 8, each of the sections 116b and 118b of fill slot 110a and exhaust slot 112, respectively, may have a radial center, or the radial distance from the center of shaft 36 to the center of the sections 116b and 118b, that is greater than the radial distance from the center of shaft 36 to the center of openings 72d and 74b (FIG. 11A). If the centers of sections 116b and 118b are radially offset from the centers of openings 72d and 74b in this manner, as disc 34 is rotated, only a corner portion of one of the sections 116b and 118b will initially overlie one of the openings 72d and 74b. Upon continued rotation, a greater cross-sectional area of the applicable section 116b and 118b will overlie the applicable opening 72d and 74b. As a greater cross-sectional area of the applicable section 116b and 118b overlies the applicable opening 72d and 74b, the flow rate of air through the applicable opening 72d and 74b increases.

Figure 13:
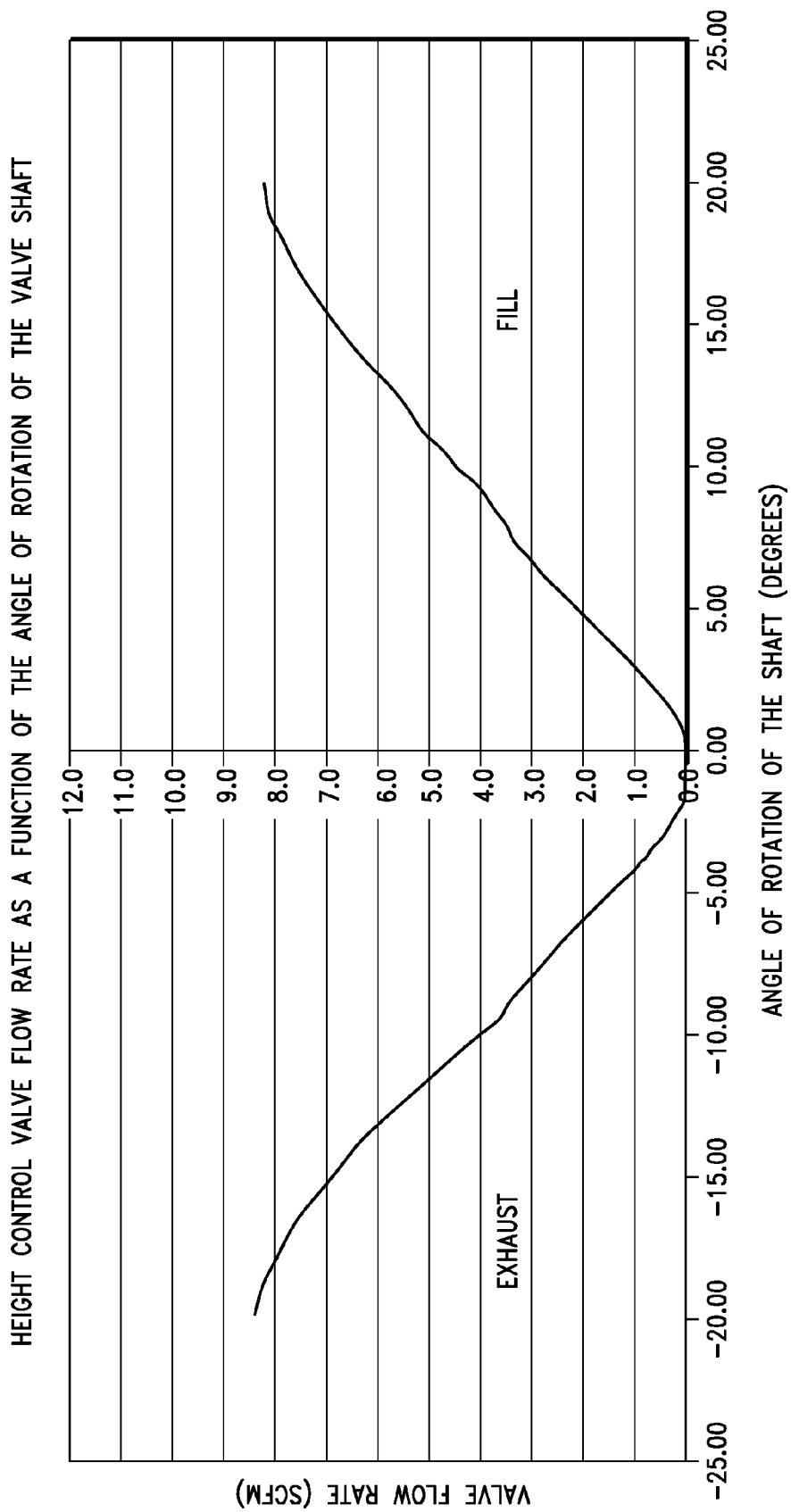
FIG. 13 is a chart showing the flow rate of air in to or out of the air spring at various degrees of rotation of the valve disc of FIG. 8 relative to its neutral position.

FIG. 13 is a chart showing the flow rate through opening 72d as a function of the degree of rotation of disc 34 from the neutral position shown in FIG. 11A when sequencing valve assembly 28 is in the first ride height position. The chart also shows the flow rate through opening 74b as a function of the degree of rotation of disc 34 from the neutral position shown in FIG. 11E when sequencing valve assembly 28 is in the second ride height position. As disc 34 rotates a greater amount relative from its neutral position, the flow rate of air through the applicable opening 72d and 74b increases because a greater portion of one of the sections 116b and 118b overlies that opening 72d or 74b. The flow rate through openings 72d and 74b also correlates with the flow rate of air in to or out of air spring 14. This flow rate control permits the valve assembly 10 to effectively turn on at a slower rate to prevent overcompensating for smaller changes in the relative heights between the frame rail 16 and the trailing arm 20, which correspond to smaller angular rotations of the disc 34, while still permitting appropriate response for large scale changes, which are indicated by greater angular rotations. Thus, the flow rate in to or out of air spring 14 is relatively small when disc 34 rotates by a small amount from its neutral position, meaning that the relative distance between trailing arm 20 and frame rail 16 only changed by a small amount. The flow rate in to or our of air spring is relatively large when disc 34 rotates by a large amount from its neutral position, meaning that the relative distance between trailing arm 20 and frame rail 16 changed by a larger amount. This allows the vehicle 12 to raise or lower slowly back to its first or second ride height when the vehicle height changes by a small amount, and to raise or lower quickly back to its first or second ride height when the vehicle height changes by a large amount.

The proportional flow rate feature of the valve assembly 10 can also be accomplished by varying the shape of the fill slots 110a-b, exhaust slot 112 or openings 72d and 74b in addition to or in place of the radial offset between the centers of sections 116b and 118b and the centers of openings 72d or 74b described above.

From the foregoing it will be seen that this invention is one well adapted to attain all ends and objectives herein-above set forth, together with the other advantages which are obvious and which are inherent to the invention.

Since many possible embodiments may be made of the invention without departing from the scope thereof, it is to be understood that all matters herein set forth or shown in the accompanying drawings are to be interpreted as illustrative, and not in a limiting sense.

While specific embodiments have been shown and discussed, various modifications may of course be made, and the invention is not limited to the specific forms or arrangement of parts and steps described herein, except insofar as such limitations are included in the following claims. Further, it will be understood that certain features and subcombinations are of utility and may be employed without reference to other features and subcombinations. This is contemplated by and is within the scope of the claims.

What is claimed and desired to be secured by Letters Patent is as follows:

1. A valve assembly, comprising:
    a first valve assembly comprising a first housing and a first valve positioned within the first housing, wherein first and second ride height ports and an air spring port extend through the first housing, and wherein the first valve is moveable between a first ride height position, in which the first ride height port is in fluid communication with the air spring port, and a second ride height position, in which the second ride height port is in fluid communication with the air spring port; and
    a second valve assembly comprising:
        a second housing, wherein an air supply port, first and second ports, and an exhaust port extend through said second housing; and
        a second valve positioned within the second housing and comprising a first surface in fluid communication with the air supply port and a second surface, wherein in response to movement of the first valve between the first ride height position and the second ride height position, the second valve moves between a first position, in which the second surface sealingly engages a portion of the second housing surrounding the first port to prevent fluid from flowing between the air supply port and the first port, and a second position, in which the second surface sealingly engages a portion of the second housing surrounding the second port to prevent fluid from flowing between the air supply port and the second port, and wherein the second valve is moveable from either of the first and second positions to a fill position, in which the air supply port is in fluid communication with the air spring port, and an exhaust position, in which the air spring port is in fluid communication with the exhaust port.

2. The valve assembly of claim 1, wherein the second valve comprises a disc that rotates between the first and second positions, wherein a fill slot and an exhaust slot are formed in the second surface of the disc, wherein the disc rotates in a first direction from either of the first and second positions to the fill position, in which the fill slot is in fluid communication with the air spring port, and wherein the disc rotates in a second direction from either of the first and second positions to the exhaust position, in which the exhaust slot is in fluid communication with the air spring port.

3. The valve assembly of claim 2, wherein the fill slot extends to a peripheral edge of the disc, wherein the fill slot is always in fluid communication with the air supply port, and wherein the exhaust slot is always in fluid communication with the exhaust port.

4. The valve assembly of claim 2, wherein at least one of the fill slot and the exhaust slot are in fluid communication with the second port when the second valve is in the first position, and wherein at least one of the fill slot and the exhaust slot are in fluid communication with the first port when the second valve is in the second position.

5. The valve assembly of claim 2, wherein the second housing comprises an end wall and a side wall coupled with the end wall, wherein the end wall and side wall at least in part define an interior chamber within which the second valve is positioned, wherein the first, second, and exhaust ports extend through the end wall, and wherein the air supply port extends through the side wall.

6. The valve assembly of claim 5, wherein the first and second ports are each radially spaced equidistant from the exhaust port.

7. The valve assembly of claim 6, wherein there is an angle of between approximately 20 to 45 degrees between the first and second ports.

8. The valve assembly of claim 5, wherein the second valve assembly further comprises a shaft that is coupled with the second valve, wherein the shaft extends through the exhaust port.

9. The valve assembly of claim 1, wherein the air supply port receives pressurized air that engages the first surface to press the second surface into sealing engagement with a portion of the second housing.

10. The valve assembly of claim 1, wherein the first and second valve assemblies are operable to adjust a ride height of a vehicle by controlling the flow of air entering and exiting an air spring that is in fluid communication with the air spring port, wherein the ride height is at a first level when the second valve is in the first position, wherein the ride height is at a second level when the second valve is in the second position, wherein air is introduced into the air spring and the ride height is raised when the second valve is in the fill position, and wherein air is exhausted from the air spring and the ride height is lowered when the second valve is in the exhaust position.

11. A height control valve assembly, comprising:
    a housing, wherein an air supply port, first and second ports, and an exhaust port extend through said housing; and
    a valve positioned within the housing and comprising a first surface in fluid communication with the air supply port and a second surface, wherein the valve moves between a first position, in which the second surface sealingly engages a portion of the housing surrounding the first port to prevent fluid from flowing between the air supply port and the first port, and a second position, in which the second surface sealingly engages a portion of the housing surrounding the second port to prevent fluid from flowing between the air supply port and the second port, and wherein the valve is moveable from either of the first and second positions to a fill position, in which the air supply port is in fluid communication with one of the first and second ports, and an exhaust position, in which one of the first and second ports is in fluid communication with the exhaust port,
    wherein the valve is operable to adjust a ride height of a vehicle by controlling the flow of air entering and exiting an air spring that is operable to be selectively placed in fluid communication with the first and second ports, wherein the ride height is at a first level when the valve is in the first position, wherein the ride height is at a second level when the valve is in the second position, wherein air is introduced into the air spring and the ride height is raised when the valve is in the fill position, and wherein air is exhausted from the air spring and the ride height is lowered when the valve is in the exhaust position.

12. The height control valve assembly of claim 11, wherein the valve comprises a disc that rotates between the first and second positions, wherein a fill slot and an exhaust slot are formed in the second surface of the disc, wherein the disc rotates in a first direction from either of the first and second positions to the fill position, in which the fill slot is in fluid communication with one of the first and second ports, and wherein the disc rotates in a second direction from either of the first and second positions to the exhaust position, in which the exhaust slot is in fluid communication with one of the first and second ports.

13. The height control valve assembly of claim 12, wherein the fill slot extends to a peripheral edge of the disc, wherein the fill slot is always in fluid communication with the air supply port, and wherein the exhaust slot is always in fluid communication with the exhaust port.

14. The height control valve assembly of claim 12, wherein at least one of the fill slot and the exhaust slot are in fluid communication with the second port when the valve is in the first position, and wherein at least one of the fill slot and the exhaust slot are in fluid communication with the first port when the valve is in the second position.

15. The height control valve assembly of claim 12, wherein the housing comprises an end wall and a side wall coupled with the end wall, wherein the end wall and side wall at least in part define an interior chamber within which the valve is positioned, wherein the first, second, and exhaust ports extend through the end wall, and wherein the air supply port extends through the side wall.

16. The height control valve assembly of claim 15, wherein the first and second ports are each radially spaced equidistant from the exhaust port.

17. The height control valve assembly of claim 16, wherein there is an angle of between approximately 20 to 45 degrees between the first and second ports.

18. The height control valve assembly of claim 15, further comprising a shaft that is coupled with the valve, wherein the shaft extends through the exhaust port.

19. The height control valve assembly of claim 11, wherein the air supply port receives pressurized air that engages the first surface to press the second surface into sealing engagement with a portion of the housing.

20. A height control valve assembly for adjusting a ride height of a vehicle by controlling a flow of air entering and exiting an air spring, comprising:
a housing comprising a first wall coupled with a second wall, wherein first and second ports extend through the first wall and are operable to be selectively placed in fluid communication with the air spring, wherein an exhaust port extends through the first wall, and wherein an air supply port extends through the second wall and receives pressurized air; and
a valve positioned within the housing and comprising a first surface in fluid communication with the air supply port and a second surface at least a portion of which is pressed into sealing engagement with the second wall, wherein the valve is rotatable between a first position, in which the ride height is at a first level and the second surface sealingly engages a portion of the second wall surrounding the first port to prevent fluid from flowing between the air supply port and the first port, and a second position, in which the ride height is at a second level and the second surface sealingly engages a portion of the second wall surrounding the second port to prevent fluid from flowing between the air supply port and the second port, and wherein the valve is rotatable from either of the first and second positions to a fill position, in which the air supply port is in fluid communication with one of the first and second ports for introducing air into the air spring and raising the ride height of the vehicle, and an exhaust position, in which one of the first and second ports is in fluid communication with the exhaust port for exhausting air from the air spring and lowering the ride height of the vehicle.

21. The height control valve assembly of claim 20, wherein the valve comprises a disc that rotates between the first and second positions, wherein a fill slot and an exhaust slot are formed in the second surface of the disc, wherein the disc rotates in a first direction from either of the first and second positions to the fill position, in which the fill slot is in fluid communication with one of the first and second ports, and wherein the disc rotates in a second direction from either of the first and second positions to the exhaust position, in which the exhaust slot is in fluid communication with one of the first and second ports.

22. The height control valve assembly of claim 21, wherein the fill slot extends to a peripheral edge of the disc, wherein the fill slot is always in fluid communication with the air supply port, and wherein the exhaust slot is always in fluid communication with the exhaust port.

23. The height control valve assembly of claim 21, wherein at least one of the fill slot and the exhaust slot are in fluid communication with the second port when the valve is in the first position, and wherein at least one of the fill slot and the exhaust slot are in fluid communication with the first port when the valve is in the second position.

24. A height control valve assembly, comprising:
a housing, wherein an air supply port, first and second ports, and an exhaust port extend through said housing; and
a valve positioned within the housing and comprising a first surface in fluid communication with the air supply port and a second surface, wherein the valve moves between a first position, in which the second surface sealingly engages a portion of the housing surrounding the first port to prevent fluid from flowing between the air supply port and the first port, and a second position, in which the second surface sealingly engages a portion of the housing surrounding the second port to prevent fluid from flowing between the air supply port and the second port, and wherein the valve is moveable from either of the first and second positions to a fill position, in which the air supply port is in fluid communication with one of the first and second ports, and an exhaust position, in which one of the first and second ports is in fluid communication with the exhaust port,
wherein the valve comprises a disc that rotates between the first and second positions, wherein a fill slot and an exhaust slot are formed in the second surface of the disc, wherein the disc rotates in a first direction from either of the first and second positions to the fill position, in which the fill slot is in fluid communication with one of the first and second ports, and wherein the disc rotates in a second direction from either of the first and second positions to the exhaust position, in which the exhaust slot is in fluid communication with one of the first and second ports, and
wherein the fill slot extends to a peripheral edge of the disc, wherein the fill slot is always in fluid communication with the air supply port, and wherein the exhaust slot is always in fluid communication with the exhaust port.

25. A height control valve assembly, comprising:
a housing, wherein an air supply port, first and second ports, and an exhaust port extend through said housing; and
a valve positioned within the housing and comprising a first surface in fluid communication with the air supply port and a second surface, wherein the valve moves between a first position, in which the second surface sealingly engages a portion of the housing surrounding the first port to prevent fluid from flowing between the air supply port and the first port, and a second position, in which the second surface sealingly engages a portion of the housing surrounding the second port to prevent fluid from flowing between the air supply port and the second port, and wherein the valve is moveable from either of the first and second positions to a fill position, in which the air supply port is in fluid communication with one of the first and second ports, and an exhaust position, in which one of the first and second ports is in fluid communication with the exhaust port,
wherein the valve comprises a disc that rotates between the first and second positions, wherein a fill slot and an exhaust slot are formed in the second surface of the disc, wherein the disc rotates in a first direction from either of the first and second positions to the fill position, in which the fill slot is in fluid communication with one of the first and second ports, and wherein the disc rotates in a second direction from either of the first and second positions to the exhaust position, in which the exhaust slot is in fluid communication with one of the first and second ports, and
wherein at least one of the fill slot and the exhaust slot are in fluid communication with the second port when the valve is in the first position, and wherein at least one of the fill slot and the exhaust slot are in fluid communication with the first port when the valve is in the second position.

26. A height control valve assembly, comprising:
a housing, wherein an air supply port, first and second ports, and an exhaust port extend through said housing; and
a valve positioned within the housing and comprising a first surface in fluid communication with the air supply port and a second surface, wherein the valve moves between a first position, in which the second surface sealingly engages a portion of the housing surrounding the first port to prevent fluid from flowing between the air supply port and the first port, and a second position, in which the second surface sealingly engages a portion of the housing surrounding the second port to prevent fluid from flowing between the air supply port and the second port, and wherein the valve is moveable from either of the first and second positions to a fill position, in which the air supply port is in fluid communication with one of the first and second ports, and an exhaust position, in which one of the first and second ports is in fluid communication with the exhaust port,
wherein the valve comprises a disc that rotates between the first and second positions, wherein a fill slot and an exhaust slot are formed in the second surface of the disc, wherein the disc rotates in a first direction from either of the first and second positions to the fill position, in which the fill slot is in fluid communication with one of the first and second ports, and wherein the disc rotates in a second direction from either of the first and second positions to the exhaust position, in which the exhaust slot is in fluid communication with one of the first and second ports, and
wherein the housing comprises an end wall and a side wall coupled with the end wall, wherein the end wall and side wall at least in part define an interior chamber within which the valve is positioned, wherein the first, second, and exhaust ports extend through the end wall, and wherein the air supply port extends through the side wall.

* * * * *